United States Patent [19]

Sheppard

[11] 4,431,952

[45] Feb. 14, 1984

[54] ELECTRIC POWERED APPARATUS

[76] Inventor: William L. Sheppard, 36655 Romulus Rd., Romulus, Mich. 48174

[21] Appl. No.: 383,348

[22] Filed: May 28, 1982

Related U.S. Application Data

[63] Continuation of Ser. No. 109,898, Jan. 7, 1980, abandoned, which is a continuation-in-part of Ser. No. 923,213, Jul. 10, 1978, abandoned.

[51] Int. Cl.³ ........................................... H02K 33/00
[52] U.S. Cl. .................................... 318/135; 335/265; 335/277; 361/190
[58] Field of Search ........ 318/135; 335/262, 265–267, 335/270–271, 248, 257, 277; 361/160, 189, 190, 208, 210

[56] References Cited

U.S. PATENT DOCUMENTS

| 1,510,455 | 10/1924 | Bucher | 335/266 |
|---|---|---|---|
| 3,010,055 | 11/1961 | Nicolaus | 335/262 |
| 3,693,125 | 9/1972 | Prouty | 335/227 X |
| 4,233,585 | 11/1980 | Sugimoto et al. | 335/262 |

FOREIGN PATENT DOCUMENTS

| 2618517 | 10/1977 | Fed. Rep. of Germany | 335/265 |
|---|---|---|---|
| 43-6665 | 3/1968 | Japan . | |
| 247033 | 2/1926 | United Kingdom . | |
| 249205 | 3/1926 | United Kingdom . | |
| 340457 | 1/1931 | United Kingdom . | |
| 362161 | 12/1931 | United Kingdom . | |
| 593590 | 12/1947 | United Kingdom . | |
| 736730 | 9/1955 | United Kingdom . | |
| 901216 | 7/1962 | United Kingdom . | |

*Primary Examiner*—B. Dobeck
*Attorney, Agent, or Firm*—Harness, Dickey & Pierce

[57] ABSTRACT

An improved vacuum pump driven by a unique electrically powered servo motor. The vacuum pump comprises an extremely simple and inexpensive pump arrangement utilizing a reciprocating piston and a rolling lobe diaphragm to eliminate the need for close tolerances while still providing high efficiency. The servo motor includes a pair of relatively movable sequentially operating armatures which eliminate the need for any external timing mechanism or for any complex delay mechanism. The servo motor of the present invention is inherently capable of operating the pump as a self-actuating demand pump.

41 Claims, 29 Drawing Figures

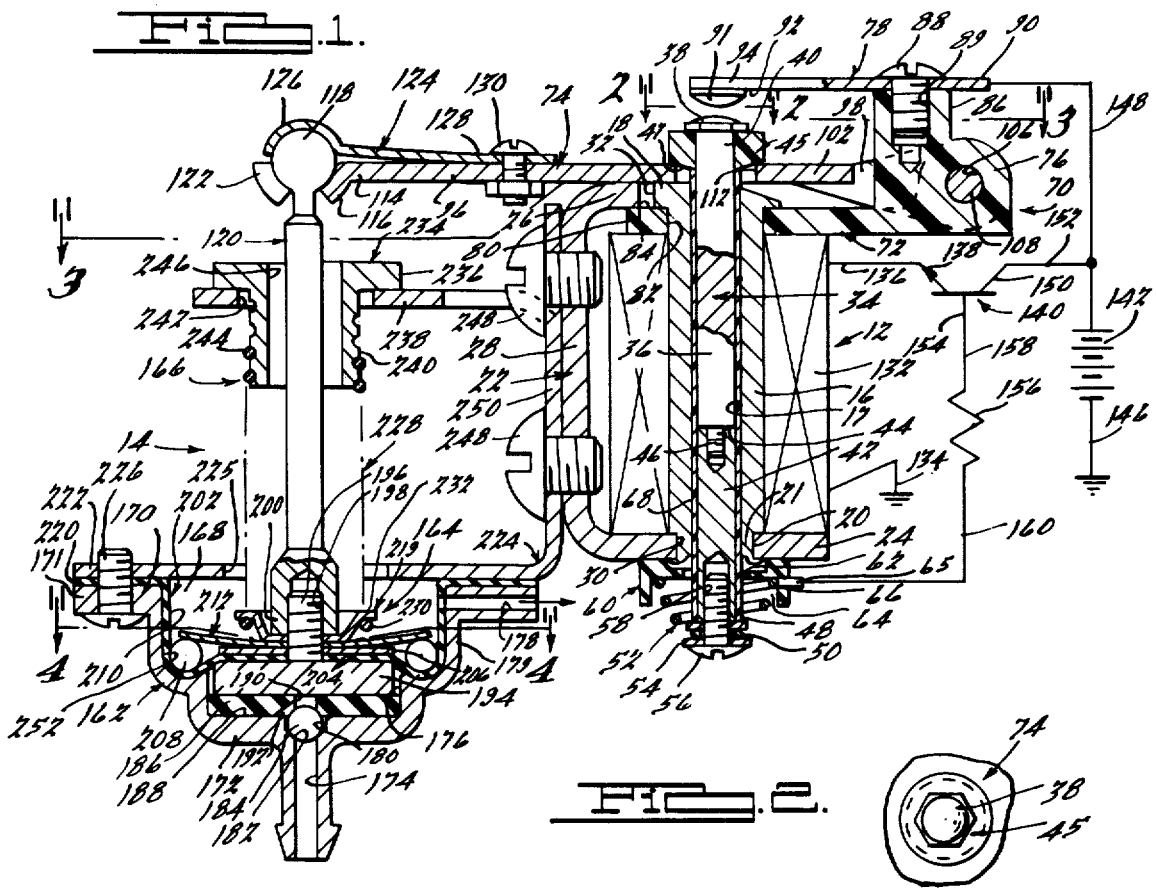

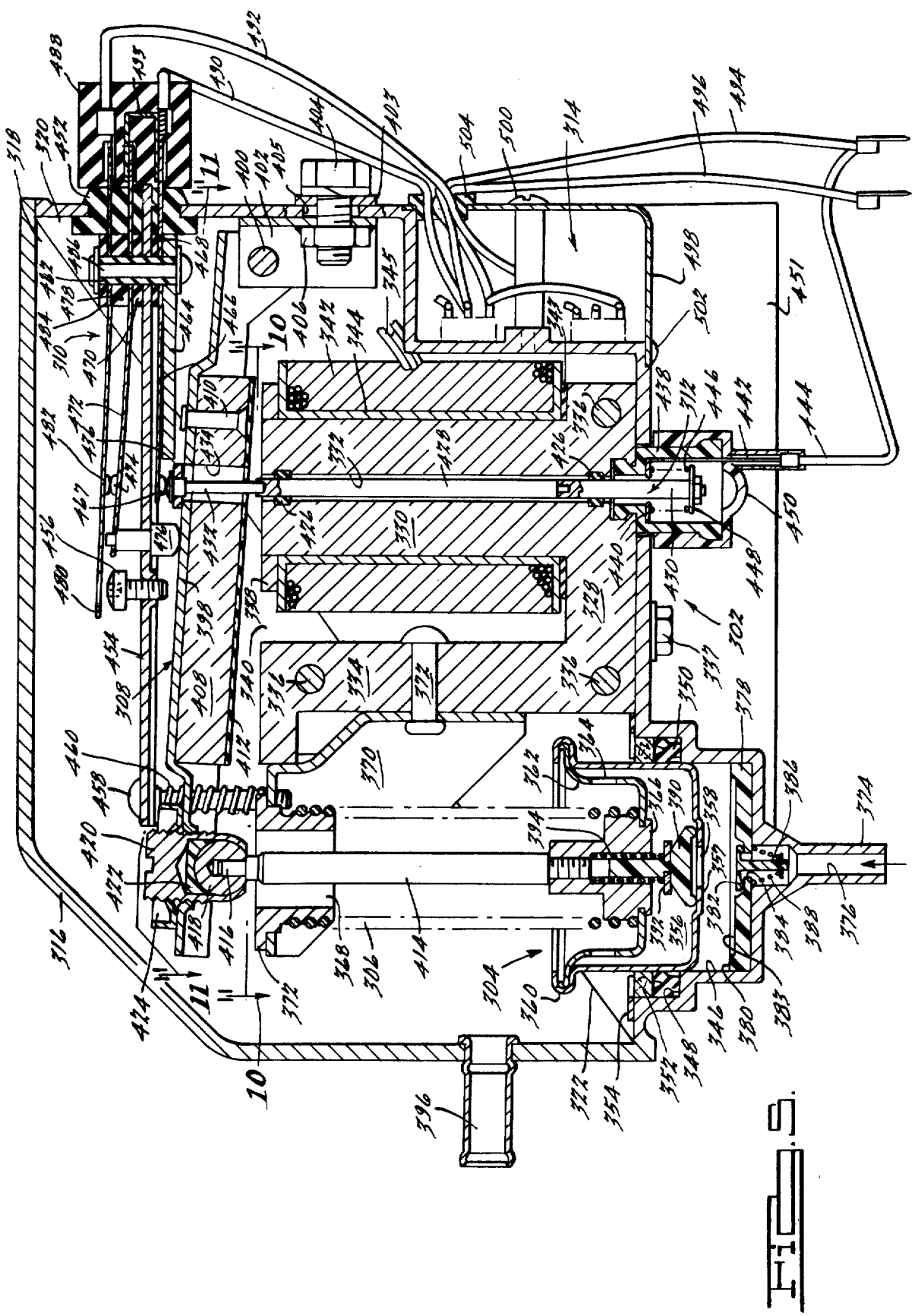

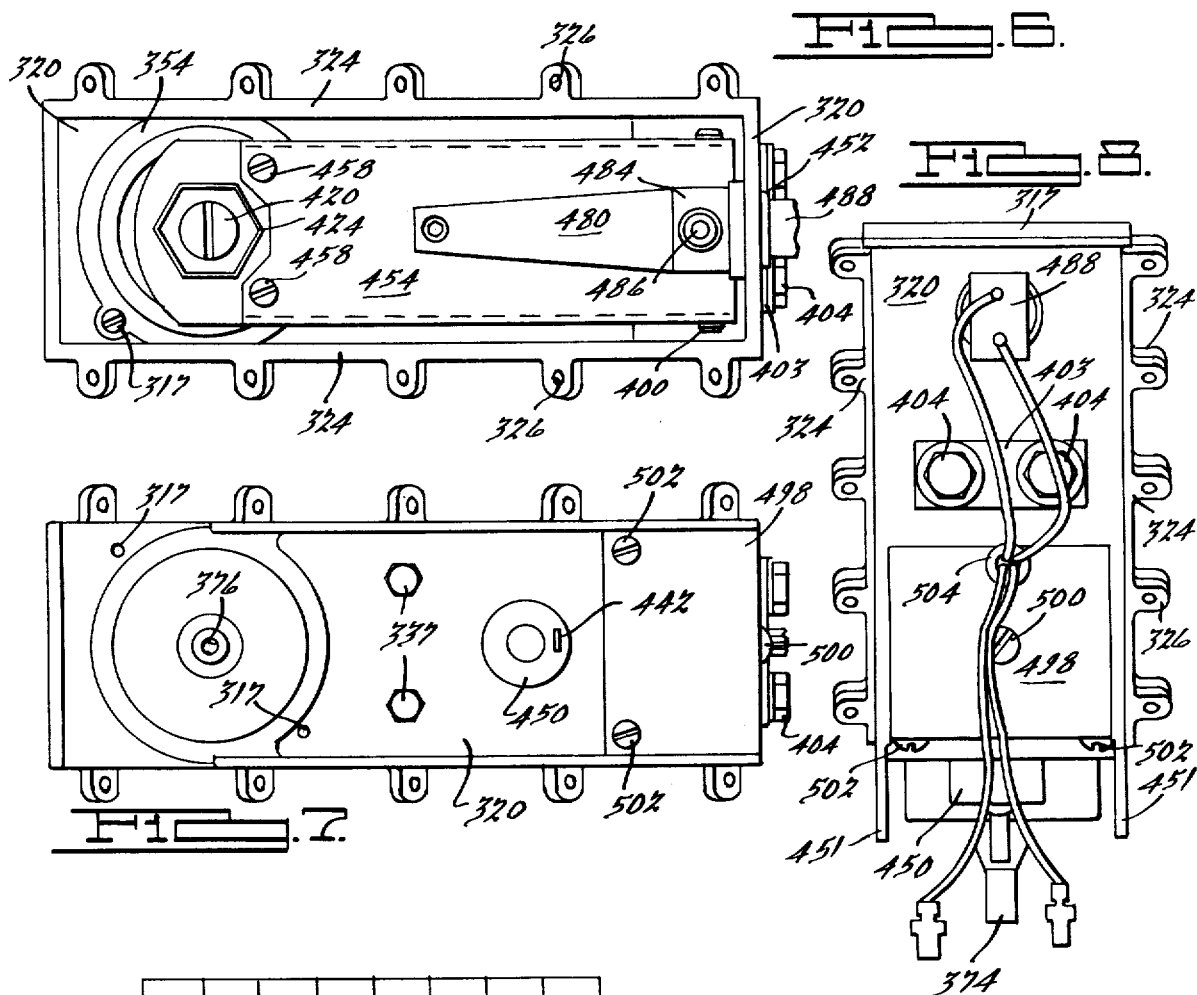
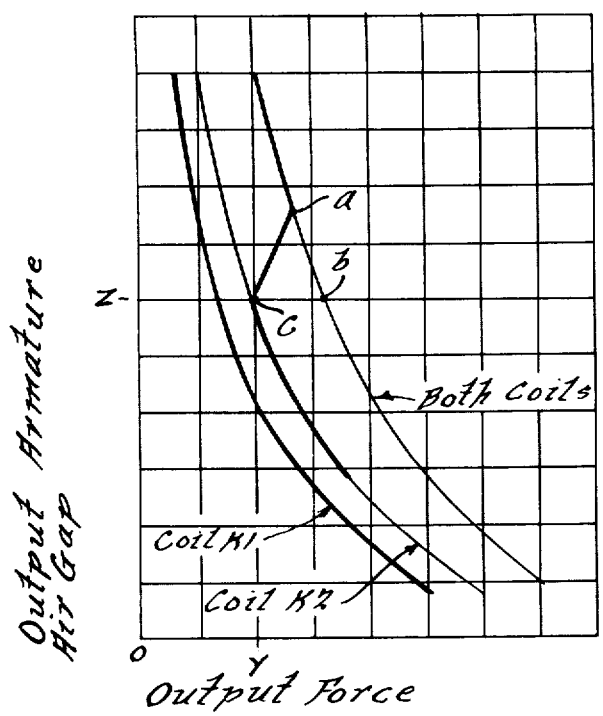
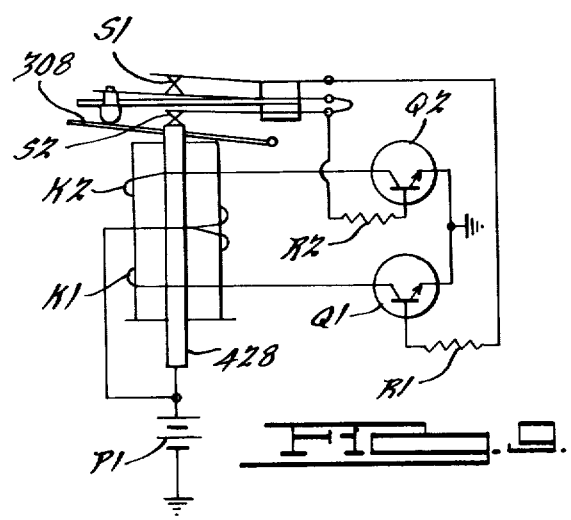

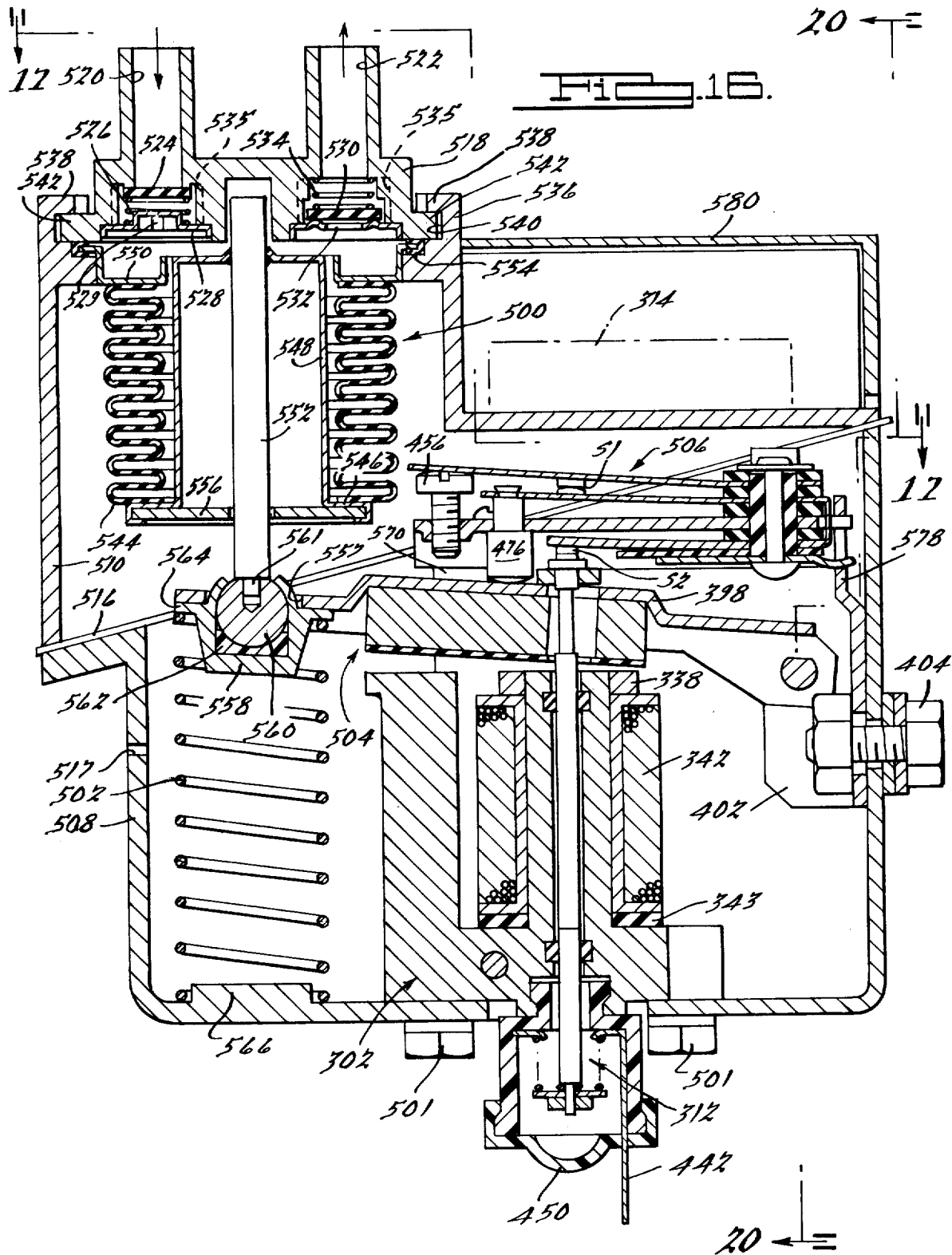

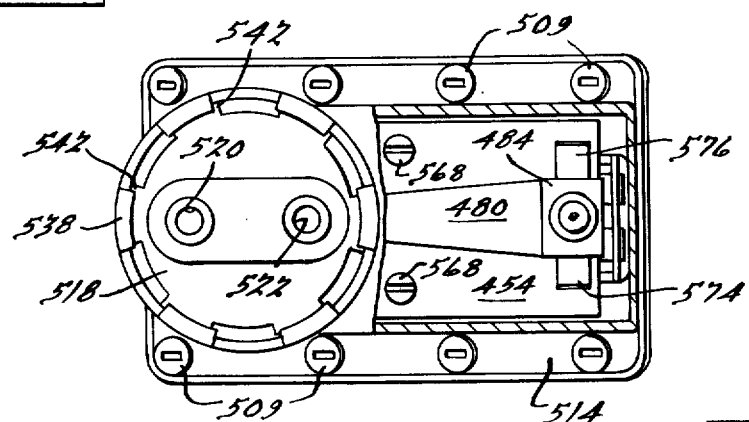
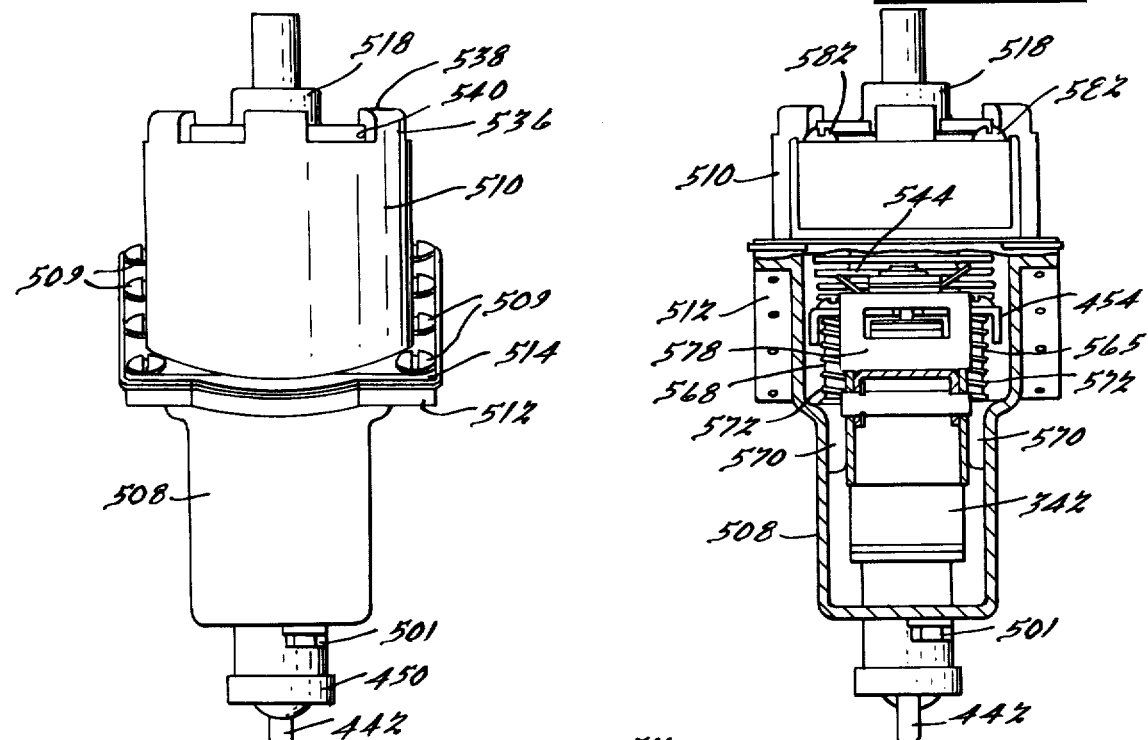
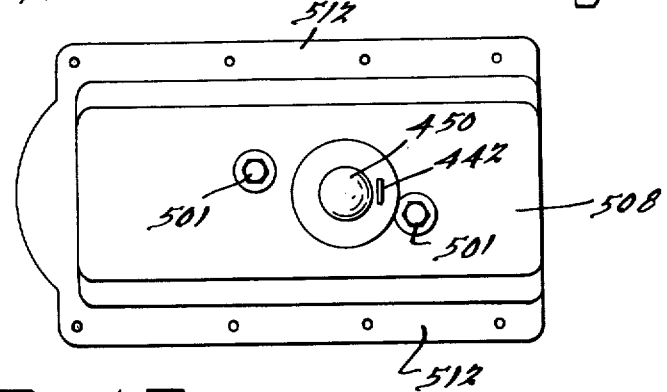

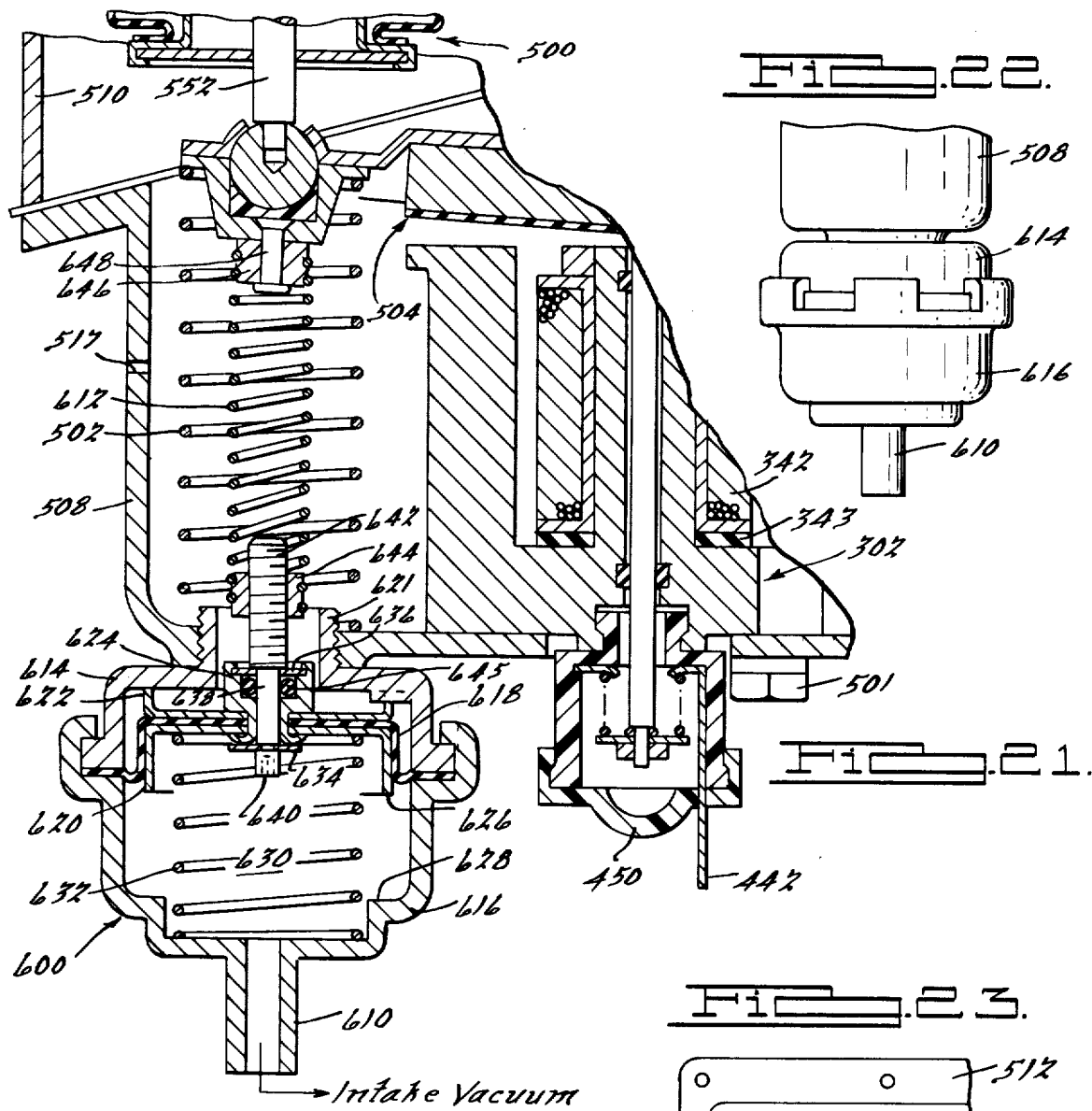
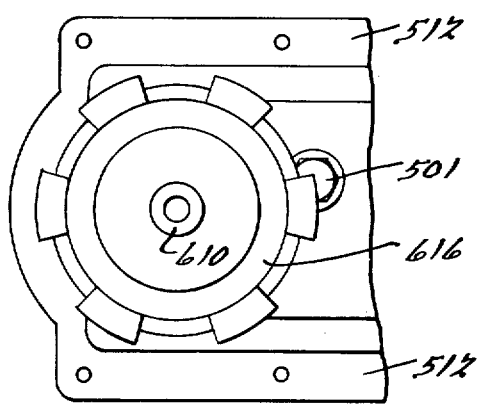
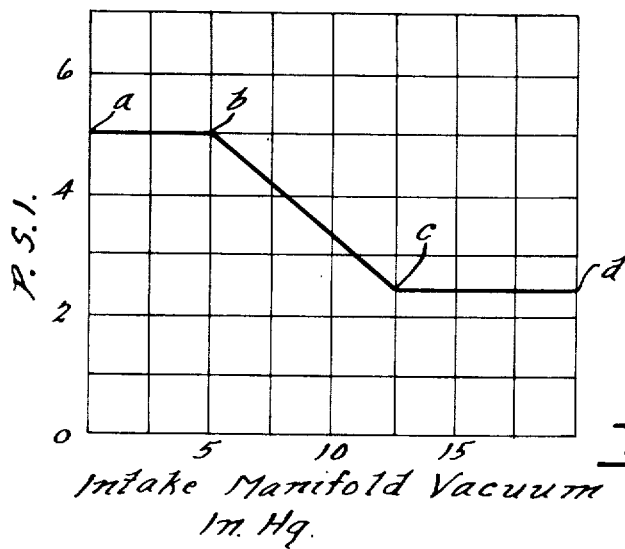

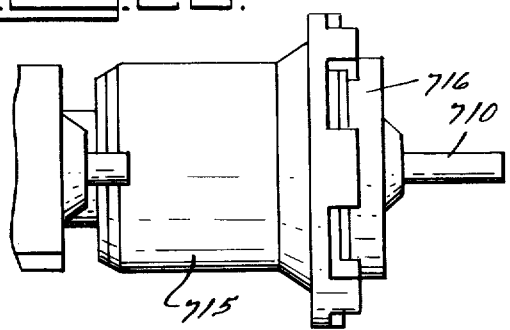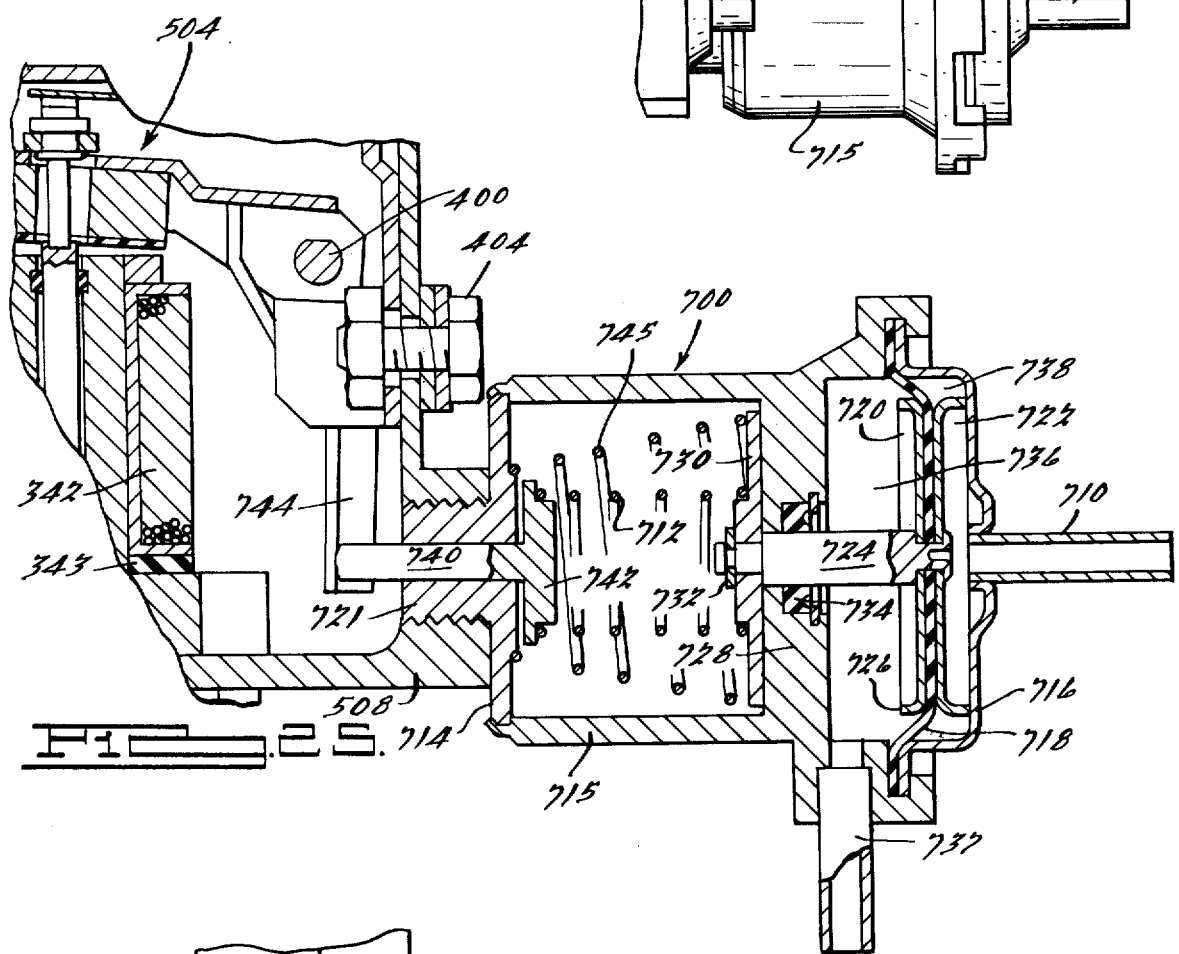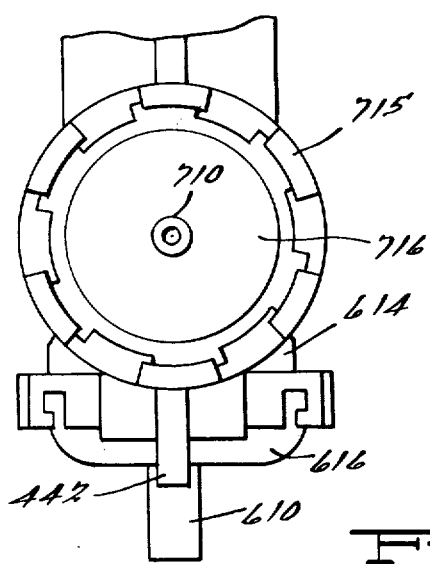

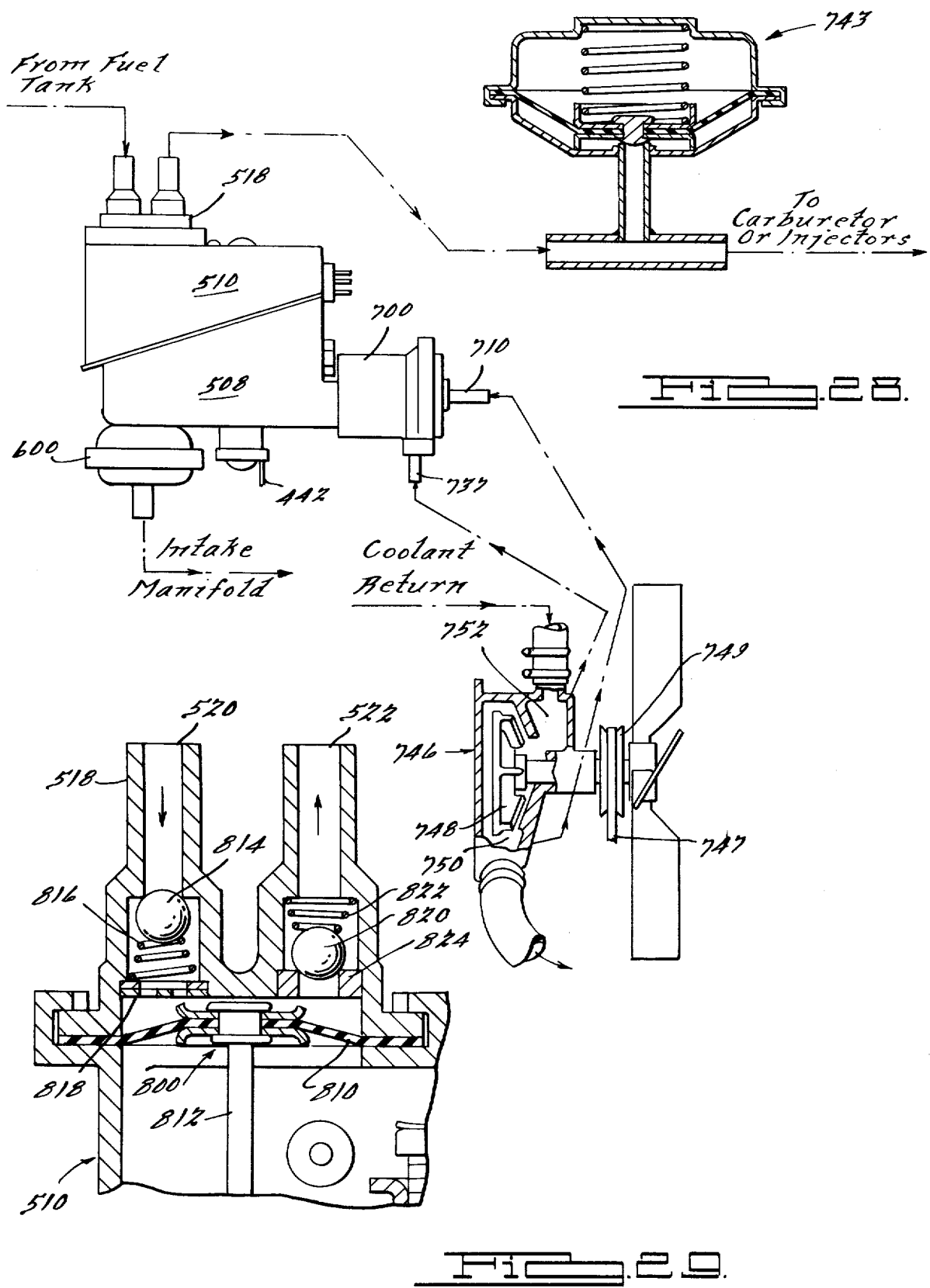

ELECTRIC POWERED APPARATUS

CROSS REFERENCE TO RELATED APPLICATION

This is a continuation of application Ser. No. 109,898 filed Jan. 7, 1980 now abandoned and a continuation-in-part of Serial No. 923,213 filed July 10, 1978 now abandoned.

BACKGROUND AND SUMMARY OF THE ADVANTAGES OF THE INVENTION

The present invention relates generally to electrically powered apparatus, and more particularly to a novel electric motor having an oscillatory direct output and being ideally suited for use on automotive vehicles, and to several novel vacuum pumps and fuel pumps especially adapted to be driven thereby.

The electric motor of the present invention provides a number of advantages over the known prior art, including: use of Applicant's discovery of a force reversal phenomenon which provides automatic cycling without requiring external timing mechanisms or complex delay devices, whereby the motor can be operated as a highly energy efficient demand device with a full power stroke on each cycle and minimum power consumption for mere switching; operation on low voltage D.C. power, so that it is ideally suited for automotive applications; simplicity in design and ease of manufacture with no critical tolerances; high output for size, weight and power consumption, thus ideal for automotive uses; minimum current drain in certain exemplary embodiments having double contacts and coils; and the use of a unique rubber and iron cushioning material to reduce noise without a proportional loss in efficiency.

The exemplary vacuum pumps of the present invention are especially adapted to be powered by the aforesaid motor and therefore provide all of the aforesaid advantages. These are particularly significant in automotive vehicle applications in which the prime mover is a diesel engine or a stratified charge engine because these type engines generally have insufficient vacuum to operate normal vacuum-driven accessories. in addition, the pumps themselves are adapted for automatic cycling on demand, are simple in design and easy to manufacture with no critical tolerances, and have superior output for their size, weight and power consumption. One piston pump embodiment also incorporates a novel dash pot arrangement providing an air cushion to dampen piston impact.

The exemplary automotive vehicle fuel pumps of the present invention also operate as demand devices and are especially adapted to be powered by the aforesaid motor. They therefore also provide all of the advantages thereof. In addition, because they operate on demand, they need not be mounted in the fuel tank to provide easy bypass of excess fuel, and they consume less energy than conventional electrical and mechanical diaphragm fuel pumps. Furthermore, one fuel pump embodiment of this invention is capable of modulating its output in response to engine load so that maximum fuel output occurs at full throttle and minimum fuel output at idle, with modulation in-between these conditions. Reduced output at idle results in reduced fuel pressure, and in carbureted engines this means less fuel consumption. Another embodiment modulates fuel output in response to engine load and speed, giving even greater control over fuel delivery. This latter embodiment responds to engine speed in a unique manner by sensing the pressure differential across the coolant pump, and then compensating for any nonlinearity. The fuel pumps of this invention also are simple in design and easy to manufacture with no critical tolerances, and have superior output for their size, weight and power consumption.

Additional advantages and features of the present invention will become apparent from the subsequent description and the appended claims, taken in conjunction with the accompanying drawings.

BRIEF DESCRIPTION OF THE DRAWINGS

FIG. 1 is a sectional view of a first embodiment of the present invention in the form of a motor driven vacuum pump;

FIG. 2 is an enlarged detail view of the contact armature shown in FIG. 1 as viewed along line 2—2 thereof;

FIG. 3 is a partial sectional view of the vacuum pump of FIG. 1, the section being taken along line 3—3 thereof;

FIG. 4 is a sectional view of the pump assembly shown in FIG. 1 with parts broken away, the section being taken along line 4—4 thereof;

FIG. 5 is a vertical sectional view of a second embodiment of the present invention in the form of a motor driven vacuum pump;

FIG. 6 is a plan view of the vacuum pump of FIG. 5, with the upper portion of the housing removed;

FIG. 7 is a bottom view of the vacuum pump of FIG. 5;

FIG. 8 is an end elevational view of the right end of the vacuum pump as shown in FIG. 5;

FIG. 9 is a schematic circuit diagram of the circuit used to control the motor of th vacuum pump of FIG. 5;

FIG. 12 is a representative graph showing output force as a function of output armature air gap;

FIG. 16 is a vertical sectional view of a third embodiment of the present invention in the form of a motor driven fuel pump;

FIG. 17 is a view taken generally along line 17—17 in FIG. 16;

FIG. 18 is an end elevational view looking at the left side of the fuel pump as illustrated in FIG. 16;

FIG. 19 is a bottom view of the fuel pump of FIG. 16;

FIG. 20 is a view taken generally along line 20—20 in FIG. 16;

FIG. 21 is a fragmentary vertical sectional view similar to FIG. 16 of a portion of a fourth embodiment of the present invention in the form of a motor driven fuel pump having engine load modulation;

FIG. 22 is a fragmentary end elevational view of the fuel pump of FIG. 21;

FIG. 23 is a fragmentary bottom view of the fuel pump of FIG. 21;

FIG. 24 is a representative graph showing engine intake manifold vacuum as a function of fuel pump output pressure;

FIG. 25 is a fragmentary vertical sectional view similar to FIG. 16 of a portion of a fifth embodiment of the present invention in the form of a motor driven fuel pump having engine load and speed modulation;

FIG. 26 is a fragmentary plan view of the fuel pump of FIG. 25;

FIG. 27 is a fragmentary end elevational view of the right hand end of the fuel pump shown in FIG. 25;

FIG. 28 is a diagrammatic view of a portion of an automotive vehicle fuel system incorporating the fifth embodiment of the present invention; and FIG. 29 is a fragmentary vertical sectional view similar to FIG. 16 of a portion of a sixth embodiment of the present invention in which the fuel pumping apparatus is in the form of a diaphragm mechanism rather than a bellows mechanism.

DESCRIPTION OF THE PREFERRED EMBODIMENT

Figure 11:
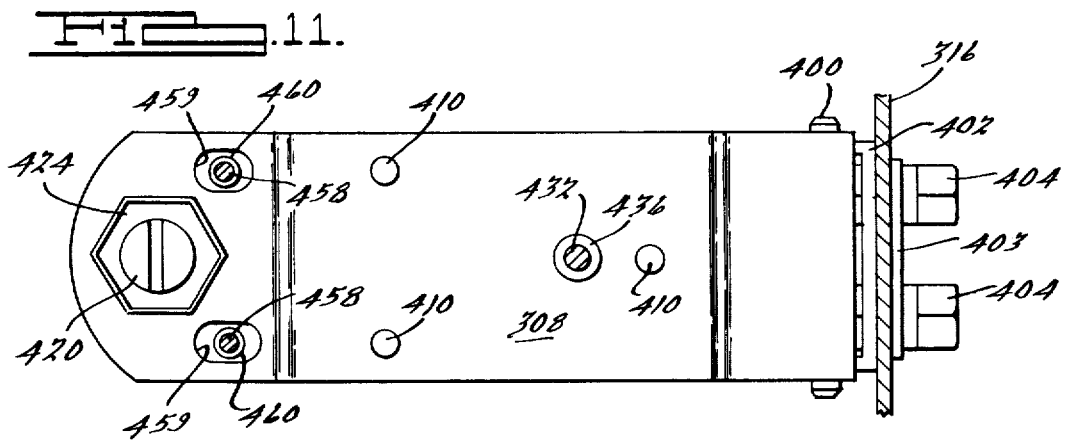
FIG. 11 is a view taken generally along line 11—11 in FIG. 5.
Figure 10:
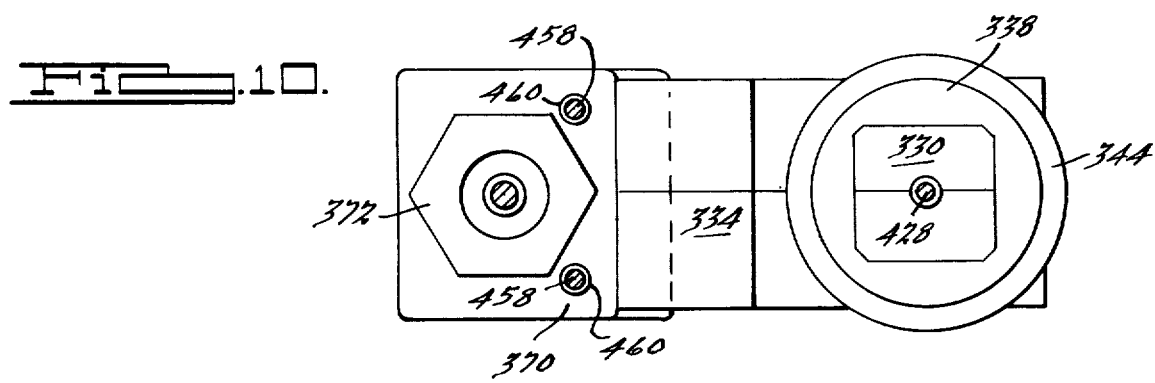
FIG. 10 is a view taken generally along line 10—10 in FIG. 5.

Referring now to the drawings, there is illustrated in FIGS. 1-5 a first embodiment of the invention in the form of an electric vacuum pump comprising a motor 12 drivingly connected to a pump assembly 14. Motor 12 includes an elongated inner pole member 16 having an axial bore 17 extending therethrough, a radially outwardly extending rectangular flange portion 18 at one end thereof and an annular groove 20 at the opposite end 21 thereof. A generally U-shaped outer pole member 22 is also provided having legs 24 and 26 and an interconnecting portion 28. Leg 24 is substantially longer than leg 26 and is provided with an opening 30 adapted to receive grooved portion 20 of inner pole member 16. Leg 26 is positioned in substantially coplanar spaced relationship with portion 18 so as to define an air gap 33 between opposed surfaces 32 and 35. Both inner and outer pole members are preferably fabricated from a suitable ferrous magnetic material having a very low residual magnetism. As best seen in FIG. 3, leg portion 26 is provided with angled chamfers or edge portions 27 and 29 on either side of surface 35.

A contact armature 34 comprising an elongated cylindrical member 36 of a ferrous magnetic material is slidably disposed within bore 17 of inner pole member. Contact armature 34 also includes an electrical contact 38 secured to one end 40 thereof and a cylindrical extension member 42 of substantially the same diameter coaxially secured to the opposite end 44 thereof. A collar member 45 is also provide surrounding upper end 40 of conact armature 34 and has a chamfered lower surface 47. Collar member 45 is preferably fabricated from a non-magnetic and dielectric material, preferably a plastic composition. Extension member 42 may be secured to cylindrical member 36 in any suitable manner such as by means of a threaded stud 46 or the like or by soldering, brazing, etc. an is of a length so as to project outward from end portion 21 of inner pole member 18. End portion 48 of extension member 42 has one end 50 of a coil conductor 52 electrically connected thereto by means of a suitable electrically conductive connector 54 and a suitable fastener 56 threadably engaging an axially extending opening 58 provided therein. An insulator 60 is provided having an opening 62 through which extension member 42 extends and a suitable annular recess 64 on one side thereof in which the opposite end 66 of coil conductor 52 is received so as to electrically insulate coil conductor 52 from leg 24 of outer pole member 22. A suitable electrical connector 65 is electrically connected to end 66 of coil conductor 52 and extends outward through insulator 60 so as to enable an electrical conductor to be connected thereto.

Contact armature 34 is fabricated from a suitable ferrous magnetic material having a low residual magnetism while extension member 42 is fabricated from a suitable non-magnetic electrically conductive material, such as brass. The outer surfaces of both contact armature 34 and extension member 42 are provided with a thin layer of a suitable electrically insulating, dielectric and anti-friction material 68, such as Teflon or another suitable tetrafluoroethylene fluorocarbon polymer or fluorinated ethylene-propylene resin composition. Material 68 serves to electrically insulate both contact armature 34 and extension member 42 from inner pole member 16, without magnetically insulating same, and to insure free movement thereof within axially extending bore 17.

An output armature and contact arm assembly 70 is also provided including an outwardly extending support arm 72, an output armature 74 pivotably secured to one end 76 of support arm 72 and a spring finger 78 also secured adjacent end 76. Support arm 70 is preferably fabricated from a suitable plastic composition and includes an arm portion 80 having an opening 82 extending therethrough in which inner pole member 16 is received. Upper surface 84 of arm portion 80 engages flange portion 18 of inner pole member 16 and leg portion 26 of outer pole member 22. A cylindrical protrusion 86 extends upwardly from upper surface 84 of support arm 72 adjacent end 76 thereof and has a threaded opening 89 provided therein adapted to receive screw 88 so as to secure one end 90 of spring finger 78 thereto. Spring finger 78 is of a relatively flexible electrically conductive material and has a contact 91 secured to lower surface 92 adjacent the opposite end 94 thereof which contact is positioned in axially aligned relationship with bore 17 so as to be engageable with electrical contact 38 when contact armature is in an extended position relative to inner pole member 16.

Output armature 74 comprises an elongated arm portion 96 having a pair of spaced substantially parallel ears 98 and 100 at one end 102 thereof provided with axially aligned openings 104. End 76 of support arm 72 is also provided with an opening 106 which is adapted to receive a suitable pin 108 which extends through openings 194 so as to pivotably secure output armature 74 thereto. Suitable snap rings 110 are provided to retain pin within openings 104 and 106. Output armature 74 is positioned so as to overlie bore 17 and is provided with a relatively large diameter opening 112 through which contact armature 34 extends. The opposite end 114 of output armature 74 has a generally hemi-spherically shaped socket 116 provided thereon which is adapted to receive generally sperical end 118 of a piston rod 120. A suitable slot 122 is provided at the outer end thereof so as to permit end 118 of piston rod 120 to be inserted into socket 116. In order to retain end 118 within socket 116, an elongated resilient retaining member 124 is provided having a complementary shaped end portion 126 engaging and resiliently urging spherical end 118 into engagement with socket 116. End 128 of retaining member 124 is secured to output armature 74 at a location spaced from socket 116 by a suitable fastener 130.

Motor 12 also includes an electrical coil 132 surrounding inner pole member 16 which is designed to induce a magnetic field within inner and outer pole members 16 and 22 in response to current flow therethrough. Coil 132 has a first electrical conductor 134 connected to ground and a second electrical conductor 136 connected to the emitter 138 of a transistor 140. A power source 142 is provided having one pole thereof connected to ground via conductor 146 and the other side connected to spring finger 78 via conductor 148. The collector terminal 150 of transistor is also connected to conductor 148 via conductor 152. Base 154 of transistor is connected to coil conductor 52 via resistor 156 and conductors 158 and 160. Preferably, the iron portion of the contact armature 34 will have a length approximately equal the axial length of coil 132.

Pump assembly 14 comprises a pump housing 162 having a piston assembly 164 reciprocatingly disposed therein and adjustable return means 166 associated therewith. Pump housing 162 is generally cylindrical in shape having a cylindrical bore 168 extending inwardly from an open upper end portion 170, and a radially outwardly extending annular flange portion 171. Cylindrical bore 168 is closed at the lower end thereof by an end wall 172 in which an inlet passage 174 is provided and has a reduced diameter portion 176 immediately adjacent end wall 172. One or more outlet passages 178 are provided through sidewall portion 179 of pump housing 162 adjacent upper end 170 thereof.

Inlet passage 174 has a check valve means provided at the inner end thereof comprising an enlarged diameter portion 180 and a valve seat 182. A sphere 184 preferably of a suitable elastomeric composition is disposed within enlarged diameter portion 180 and adapted to sealingly engage valve seat 182 so as to prevent fluid flow out of pump housing 162 through inlet passage 174. In order to maintain sphere 184 in position, an elastomeric bumper member 186 is secured to bottom surface 188 of end wall 172 and has an opening 190 provided therein in aligned relationship with inlet passage 174. The lower end of opening 190 is flared radially outwardly so as to allow sphere 184 to move upwardly out of engagement with valve seat 182 during a suction stroke of the pump. A plurality of depending ribs 192 are provided in the flared portion of opening 190 so as to prevent sphere 184 from moving into sealing engagement with member 186.

Piston assembly 164 comprises a piston 194 of a diameter slightly less than the diameter of portion 176 of pump housing 162. Piston 194 has an upwardly projecting threaded stud 196 adapted to be received in a threaded opening 198 provided in lower end 200 of piston rod 120. A rolling lobe diaphragm 202 of a suitable flexible material is also provided overlying open end 170 of pump housing 162 and having a portion retained in engaging relationship with an upper surface 204 of piston 194 by a suitable washer-like retainer member 206 of a diameter slightly less than piston 194.

A continuous plurality of contiguous spheres or balls 208 are positioned generally radially outwardly of piston 194 and are retained in engaging relationship with upper surface 210 of diaphragm 202 by a disc spring 212. As best seen with reference to FIG. 4, disc spring 212 is circular in shape having a diameter intermediate that of bore 168 and piston 194 and has a plurality of slits 214 extending radially inwardly so as to divide the periphery thereof into a plurality of independently flexible fingers 216. As shown, each spring finger 216 has a circumferential width approximately equal to the diameter of each sphere 208. A slotted portion 218 is provided disposed radially inwardly from slits 214 to provide independent flexible movement of each finger 216. Spheres 208 are free to move with respect to spring 212 and housing 162. Spring 212, member 206 and diaphragm 202 are all secured between lower end 200 of piston rod 120 and surface 204 of piston 194, as is an extension spring retainer 219.

The outer periphery 220 of diaphragm 202 is securely and sealingly clamped between flange portion 171 of pump housing 162 and one leg portion 222 of a generally U-shaped pump support bracket 224 by means of a plurality of fasteners 226.

Leg portion 222 of pump support bracket 224 has a relatively large diameter opening 225 provided therein through which piston rod 120 extends, as does an extension spring 228, disposed coaxially therewith. The lower end portion 230 of extension spring 228 is attached to a flange portion 232 of extension spring retainer 219. An adjusting nut 234 is provided having a hexagonal flange portion 236 supportingly engaging leg portion 238 of pump support bracket 224 and a spirally grooved cylindrical portion 240 depending through an opening 242 provided in leg 238. Upper end 244 of extension spring 228 threadedly engages spirally grooved portion 240 of adjusting nut 234. Adjusting nut 234 is also provided with a longitudinally extending opening 246 through which piston rod 120 extends.

Pump support bracket 224 is secured to interconnecting portion 28 of outer pole member 22 by suitable fasteners 248 extending through an interconnecting portion 250 thereof extending between legs 222 and 238.

In operation, extension spring 228 will exert an upward force on piston assembly 164 to cause piston 194, piston rod 120, diaphragm 202 and the associated components to move upwardly as viewed in FIG. 1, thereby drawing a fluid to be pumped through inlet passage 174 and the check valve means provided therein into a pumping chamber disposed between diaphragm 202 and housing 162. During this suction stroke it will be seen that outlet passage 178 is closed by diaphragm 202 overlying same in cooperation with spring 212 and spheres 208 which operate to maintain diaphragm 202 in uniform engagement with the wall of pump housing 162.

Upward movement of piston rod 120 also causes output armature 74 to move upwardly as viewed in FIG. 1. As opening 112 of output armature 74 engages collar member 45 surrounding contact armature 34, it will also effect an upward movement of contact armature 34, thereby moving contact 38 into engagement with conact 91 of spring finger 78. Once contacts 38 and 91 engage, the circuit means will be energized with current initially flowing from power source 142 through conductor 148, spring finger 78, contacts 91 and 38, contact armature 34, extension member 42, connection 54, coil conductor 52, conductor 160, and resistor 156 to base 154 of transistor 140, thereby biasing transistor 140 into a conductive condition so as to allow current flow through conductors 152 and 136 to energize coil 132. The current flow through coil 132 will operate to induce a magnetic flux in inner and outer pole members 16 and 22 respectively so as to polarize opposed surfaces 31 and 35, thereby creating a magnetic field therebetween. This magnetic field will exert an attraction force on output armature 74 causing it to pivot downwardly about pin 108, thereby bringing it very close to or into engagement with both flange portion 18 and leg portion 26 so as to complete a magnetic circuit therebetween.

While the reasons are not fully understood, it has been found that the magnetic field created by energization of the coil causes an upward bias on the contact armature, until such time as the output armature completes the magnetic circuit across gap 33, at which time contact armature 34 is rapidly drawn downwardly, thereby moving contacts 38 and 91 out of engagement. The opening of contacts 38 and 91 will operate to remove the bias potential applied to transistor 140 causing it to switch to a nonconducting state, thereby interrupting current flow to coil 132, but the momentum of contact armature 34 carries it to the position shown in FIG. 1. The interruption of current flow will eliminate the magnetic attraction exerted on both contact armature 34 and output armature 74, allowing extension spring 228 to move output armature 74 upwardly which in turn will cause contact armature to move upwardly, thereby bringing contacts 38 and 91 into mutual engagement to automatically initiate the next operational cycle of motor 12.

Reciprocable or oscillatory movement of output armature 74 is transmitted through piston rod 120 connected thereto to cause piston 194 to reciprocate within pump housing 162. As piston 194 moves upwardly, as seen in FIG. 1, due to the contracting bias of extension spring 228, diaphragm 202 will be drawn along therewith, thereby creating a suction at inlet passage 174, in turn causing sphere 184 to move upwardly allowing fluid to enter into the pumping chamber. Fluid flow into the pumping chamber from outlet passage 178 is effectively prevented by engagement of diaphragm 202 with sidewall 179 in a sealing relationship. Once piston 194 begins its downward movement due to attraction of output armature 74 by the magnetic field, sphere 184 will move into sealing engagement with valve seat 182 sealing inlet passage 174. The fluid will then be subjected to pressure by continued downward movement of piston 194 and diaphragm 202 so as to cause diaphragm 202 to move out of engagement with sidewall 179, thereby allowing the fluid to flow from the pumping chamber through outlet passage 178. As seen in FIG. 1, spring 212 and spheres 208 will cooperate to prevent diaphragm 202 from buckling in an upward direction and ultimately will force diaphragm 202 into engagement with shoulder 252 in pump housing 162 so as to minimize the residual clearance volume in the pumping chamber. Bumper 186 will arrest the downward movement of piston 194 and absorb the impact of same. Because retainer 124 is resilient any overtravel of the output armature will be absorbed by deflection thereof, thereby preventing any possible damage to pump assembly 14 and permitting the use of wide tolerances on all parts with assurance that the output armature 74 will still contact or move into very close promixity to poles 18 and 26.

During operational testing of the motor of the present invention it has been observed that when the output armature is removed from the assembly and the coil is energized with the contact armature in a fully depressed position such as is illustrated in FIG. 1, the contact armature will be caused to move forcefully outwardly. Also, when the output armature is assembled to the motor and positioned out of engagement with inner and outer pole members, energization of the coil will result in output armature being drawn downwardly while contact armature is still biased to an extended position. As soon as the output armature engages inner and outer pole members, however, the contact armature is drawn forcefully downwardly. As previously mentioned, the specific reasons for this operation are not fully understood but it is apparent that these operating characteristics will enable the motor of the present invention to be easily adapted for a wide variety of applications wholly independent of its use with the pump disclosed herein (in which case a suitable return spring would be provided to replace the function of spring 228).

The present invention may easily be utilized as a demand pump without the need for external sensors, limit switches or other controls. For every setting of spring 228 there will be a maximum attainable vacuum, which when reached will cause the pump to stall, which in turn will prevent the contact armature from moving upwardly to close the contacts to energize the motor. Upon a subsequent decrease in vacuum (increase in absolute pressure) spring 228 will then be capable of pulling the piston upwardly to reenergize the motor. Thus the system will automatically cycle to whatever extent is necessary to maintain or seek to maintain the set vacuum. The set vacuum can be increased or decreased by rotaton of adjusting nut 234 so as to shorten or lengthen the working length of spring 228.

It should be noted that while the present embodiment has been described utilizing a switching transistor to control current flow to coil 132, transistor 140 may be eliminated and coil 132 can be connected directly in series with contacts 38 and 91. Transistor 140 is provided primarily to limit current flow across contacts 38 and 91 and thereby reduce arcing. Also, in order to insure long trouble-free operation, spring finger 78 is positioned with respect to contact armature 34 so as to be deflected slightly upwardly when contact armature 34 is in a fully extended position. This slight deflection not only provides a scrubbing effect between contacts 34 and 91 to aid in preventing any build-up of corrosion thereon but also retains the mutual engagement between the contacts slightly longer so as to thereby impart sufficient momentum to contact armature 34 so as to insure full travel thereof.

In FIGS. 5 through 15, a second embodiment of the invention is illustrated in the form of a vacuum pump ideally suited for automotive use. Generally speaking, the pump of this embodiment comprises an electric motor 302, a pump assembly 304, a power spring 306 for actuating the pump, an output armature assembly 308 interconnecting the motor and pump assembly for the purpose of cocking power spring 306, and circuit means comprising a contact beam assembly 310, a contact armature assembly 312 and a power supply 314. The entire device is disposed within a housing 316 formed of aluminum or other non-ferrous material. Housing 316 is formed in two parts 318 and 320 separated by a diagonal seam 322. Each part is provided with a suitable fastening flange 324 and aligned apertures 326 for suitable fasteners (not shown) to secure the assembly.

Motor 302 comprises an integrally formed core 328 including an integral first pole piece 330 of generally square cross-section and having a bore 332 extending longitudinally therethrough, and a second integral pole piece 334 joined at the bottom thereof, but spaced therefrom at the upper end thereof as best seen in FIG. 5. Core 328 is preferably formed of sintered iron in two separate half sections, the plane of separation being parallel to that of the drawing of FIG. 5 and passing through the center of bore 332. The two halves of core 328 are joined together in any suitable manner such as by through fasteners 336, preferably rivets, and the core secured to housing 316 by fasteners 337. For optimum operation of the motor, core 328 should be formed of a ferrous magnetic material having low residual magnetism. Although a round cross-section pole piece 330 would be preferable, the limitations of the sintering process make it unfeasible. Press fit on the upper end of first pole piece 330 is a circular washer 338 formed of steel or the like and defining with second pole piece 334 a polar air gap 340. Preferably the upper surfaces of both pole pieces and washer 338 lie in a common plane.

First pole piece 330 is surrounded by an electric coil 342 disposed within the usual retainer 344 resting on an annular elastomeric cushion 343. Preferably coil 342 is formed of two electrically independent coils, which may be simultaneously wound. The leads from coil 342 are indicated at 345.

Pump assembly 304 generally comprises a cylinder 346 formed in housing 316 and counterbored at 348 to receive an annular elastomeric seal member 350 and lubricated felt seal 352 which are retained in place by means of retainer 354 affixed to housing 316 by suitable fasteners at 317. Movably disposed within cylinder 346 is a sheet metal piston 356 having a generally flat lower surface on which there is a central projection 357 containing a central output passageway 358 and cylindrical side walls terminating at the upper end in a crimped portion 360 which retains (in the manner shown) an inner piston 362 having a plurality of apertures 364 in the side wall thereof and mounted in the center thereof a spring anchor 366. To reduce friction, piston 356 may be externally coated with Teflon or the like. Spring anchor 366 has threadably engaged about the periphery thereof power extension spring 306, the upper end of which is threadably engaged with a spring adjustor 368 affixed to and supportable by a suitable bracket 370 retained on core 328 by means of a suitable fastener 372. The upper end of spring adjustor 368 is provided with a hex head 372 whereby the adjustor may be easily rotated in bracket 370 to move the upper end of spring 306 up or down on the helical threads thereon to adjust the original tension of spring 306.

The inlet to the pump is defined by an inlet nipple 374 to which a suitable hose or the like may be attached, formed integrally in housing 316 and having an inlet bore 376. Cylinder 346 has disposed in the bottom thereof (as shown in FIG. 5) an elastomeric dampener and valve seat 378 having a raised outer peripheral edge 380, a depressed valve surface 382, and an intermediate surface 383 having a through-opening 384 in communication with bore 376. Valve seat 378 may be formed of neoprene, and is provided with a generally T-shaped intake valve 386 having a head normally sealingly engaging surface 382 by virtue of the bias of a tapered coil compression spring 388 acting between the bottom of valve seat 378 and a suitable snap ring or the like on the stem of intake valve 386, as best illustrated in FIG. 5. The intake valve operates in the normanl manner as a check valve permitting the flow of inlet fluid into the cylinder but preventing the exhaust of same. To improve sealing, intake valve 386 may be provided with an annular bead adjacent the outer peripheral edge of the lower surface of the head thereof.

Piston 356 is provided with an exhaust valve 390 having at the lower surface thereof a bead sealingly engaging the lower surface of piston 356 around passageway 358 and having an upwardly projecting stem portion disposed within a central opening in spring anchor 366. Exhaust valve 390 may be formed of an elastomeric material, such as neoprene, and has a weight 392 disposed around the neck thereof, and a coil compression spring 394 acting between the weight and the upper end of the opening in spring anchor 366 to bias the exhaust valve to a normally closed position. The inertia of weight 392 increases valve closing forces on the piston up stroke and decreases the valve closing force of spring 394 on the piston down stroke.

As can be visualized with referenced to FIG. 5, upward movement of piston 356 in cylinder 346 will cause inlet fluid to be drawn through inlet bore 376 and intake valve 386, and downward movement of the piston will cause fluid to be exhausted through exhaust valve 390 whereupon itflows through apertures 364 into the interior of housing 316. When used as a source of vacuum in an automotive vehicle, the vacuum created by the pump of the present invention may be increased by the amount of existing intake manifold vacuum by connecting the interior of housing 316 to the intake manifold from the vehicle engine. A suitable nipple 396 may be provided for this purpose.

Valve seat 378 cooperates with the bottom of piston 346 to provide a unique dash pot function to dampen the impact of the piston at the end of its exhaust stroke. As best seen in FIG. 5, the parts are sized so that on its down (exhaust) stroke the outer bottom surface of piston 356 engages elastomeric ridge 380 before projection 357 engages intermediate surface 383 on valve seat 378. The air which is thereby trapped between piston 356 and valve seat 378 cushions the impact of the piston at the end of its stroke.

Output armature assembly 308 comprises an elongated output armature lever 398 pivoted at its right hand end, as shown in FIG. 5, about a pivot shaft 400 supported by a U-shaped (in plan) sheet metal bracket 402 affixed to the right hand end wall of housing 316 by means of a clamp plate 403, and a pair of threaded fasteners 404 passing through the clamp plate and holes 405 in housing 316, and threadably engaging nuts 406, respectively welded to bracket 402. Holes 405 are preferably vertically elongated in order to adjust the position of pivot shaft 400. Intermediate its ends, lever 398 is provided with a central offset portion in which is disposed output armature 408, which is preferably formed of a magnetic material having low residual magnetism. For example, armature 408 may be formed from sintered iron, and is affixed in place by a plurality of fasteners such as shown at 410.

The lower surface of output armature 408 may optionally be provided with a layer 412 of resilient cushioning material. Layer 412 substantially reduces the noise and impact which would otherwise result from the output armature the top of the core, and is preferably formed of a mixture of rubber and finely divided iron powder. Applicant has found that an EPDM rubber (50 durometer) filled 50% by volume with pure iron powder performs very satisfactorily. As can be visualized, the output armature assembly pivots from the position shown in FIG. 5 to one in which layer 412 is disposed against the upper planar surface of core 328, this latter position being accurately established by properly adjusting the location of pivot shaft 400.

The left end of output armature assembly 308, as shown in FIG. 5, is connected to pump assembly 304 by means of a connecting rod 414 threadably connected at its lower end to spring anchor 366 and having at its upper end a projection 416 disposed within a suitable bore in a bronze ball 418 crimped within an adjuster 420 threadably disposed within a generally vertically threaded extending opening in the left end of lever 398. Ball 418 is pivotally supported within adjuster 420 with ball 418 in part seating on a ball seat 422 formed of a low friction material such as Teflon or the like. The upper end of adjuster 420 may be provided with a slot to facilitate the adjustment rotation thereof with a screw driver and a sheet metal lock nut 424 is provided to maintain the adjusted position.

Contact armature assembly 312 is slidably supported for vertical reciprocal movement in bore 332 by means of a pair of Teflon bearings 426, and comprises an armature 428 formed of a magnetic material having low residual magnetism having soldered to the lower end thereof a non-magnetic electrically conductive extension 430 (preferably formed out of brass, and hollow if desired to reduce weight) and having soldered to the upper end thereof a contact head 432 also formed of a non-magnetic electrically conductive material such as brass. Contact head 432 extends upwardly through an opening 434 in the output armature assembly and is provided at the adjacent upper end thereof with an insulating washer 436. The lower end of extension 430 extends within a plastic housing 438 affixed to housing 316 and core 328 and communicating with the lower end of bore 332. The contact armature should be maintained in spaced relationship to the walls of bore 332 in order to prevent the armature from freezing to the core. This space, however, should be as small as possible. The iron part of armature 428 is preferably of a length approximately equal to or slightly less than that of coil 342, for best efficiency. Electricity is communicated from power supply 314 to the contact armature assembly via a metal connector 440 disposed within housing 438 and having a downwardly extending conductor 442 to which may be conductively attached, in the usual manner, electrical conductor 444. Connector 440 is electrically connected to the contact armature by means of a lightweight metal spring 446 extending between connector 440 snd a metal retainer 448 affixed to the lower end of extension 430, as shown in FIG. 5. Housing 438 is closed by means of a snap-on plastic cover 450 having an aperture in the end thereof through which conductor 442 passes. The latter assembly is somewhat protected by a pair of flanges 451 integrally formed with housing 316.

Contact beam assembly 310 is supported in an opening in the right hand end of housing 316 (FIG. 5) by means of an elastomeric insulating grommet 452 and comprises an elongated sheet metal adjusting lever 454 having a projection at its right hand end imbedded within grommet 452, a centrally disposed threaded aperture in which is threadably positioned an adjusting screw 456 having a hex socket in the end thereof, and at the left hand end (FIG. 5) a pair of adjusting screws 458 passing through openings 459 in lever 398 and threadably engaging bracket 370, with a spring 460 disposed therebetween to maintain adjusted position. Sandwiched together about a square key 462 formed of insulating material and passing through a square opening (not shown) in lever 454 are, from the bottom up, a support arm 464 formed of insulating material, a primary contact beam 466 having contact 467 at the outer end thereof engageable with contact head 432, an insulating washer 468, lever 454, an insulating washer 470, a lower secondary contact beam 472 having at the upper surface thereof a contact 474 and at the outer end thereof a downwardly extending insulating push rod 476 passing through a suitably positioned aperture in lever 454 and engaging the upper surface of output armature assembly 308, an insulating washer 478, an upper secondary contact beam 480 having a contact 482 on the lower surface thereof engageable with contact 474 and contcct beam 472, and a final insulating washer 484. The entire assembly is held together, as best shown in FIG. 5, by means of a through fastener 486. Each of the contact beams is formed out of a resilient electrically conductive material such as phosphur bronze and has a conductive portion extending through grommet 452 and slidably engageable by a plug 488 for removably interconnecting electric conductors 490 and 492 to contact beams 466 and 480, respectively, and electrically interconnecting contact beams 466 and 472 to one another at 493, all in the usual manner as best illustrated in FIG. 5.

Power supply 314 contains the circuitry schematically shown in FIG. 9, and is electrically connected to the contact armature by conductor 444 (via an intermediate conductor 494), to the contact beam assembly by conductors 490 and 492, and to a suitable D.C. power supply by the conductors 494 and 496. The power supply is enclosed by a cover 498 affixed to housing 316 by suitable fasteners 500 and 502, with the conductors passing through a grommet 504 in the cover. The circuitry functions in the following manner. The energization of the coils represented by K1 and K2 is controlled by transistors Q1 and Q2, respectively. The conductive states of transistors Q1 and Q2 are in turn controlled by switching contacts S1 and S2, respectively. Switching contacts S1 correspond to contacts 474 and 482 (FIG. 5) and switching contacts S2 correspond to contact head 432 and contact 467. In particular, switching contacts S1 and S2 are initially both closed, thus providing bias current to the base of both transistors Q1 and Q2 from voltage source P1 through contact armature 428, contacts S1 and S2, and bias resistors R1 and R2, respectively. Consequently, transistors Q1 and Q2 will conduct, thereby energizing coils K1 and K2. When switching contacts S1 open, the bias current to transistor Q1 is removed, thus rendering Q1 nonconductive and deenergizing coil K1. Similarly, when switching contacts S2 are thereafter opened, the bias current to transistor Q2 is also removed, thereby rendering nonconductive transistor Q2 and deenergizing coil K2. Subsequently, when both switching contacts S1 and S2 are simultaneously closed, bias current is again restored to the base of both transistors Q1 and Q2, rendering both transistors conductive and again energizing both coils K1 and K2. The use of a transistor circuit is not required, but is preferred in order to minimize arcing of the contacts. Conventional voltage spike suppression circuitry may be used to eliminate any radio interference which may occur.

The operation of the embodiment of FIGS. 5-15 is substantially identical with that of the embodiment of FIGS. 1-4, the primary difference being that the second embodiment utilizes a different vacuum pump and utilizes dual coils and contacts to actuate the motor. The advantage of dual coils with a dual switching arrangement is that it permits full performance with reduced power consumption by the use of dual coils possible to provide timing whereby both coils are energized during the maximum air-gap portion of the cycle when the magnetic flux strength is at a minimum and one coil when the output armature air-gap is small and the magnetic flux strength is approaching maximum. Thus, all the necessary forces are generated but at a lesser overall power consumption.

Figure 13:
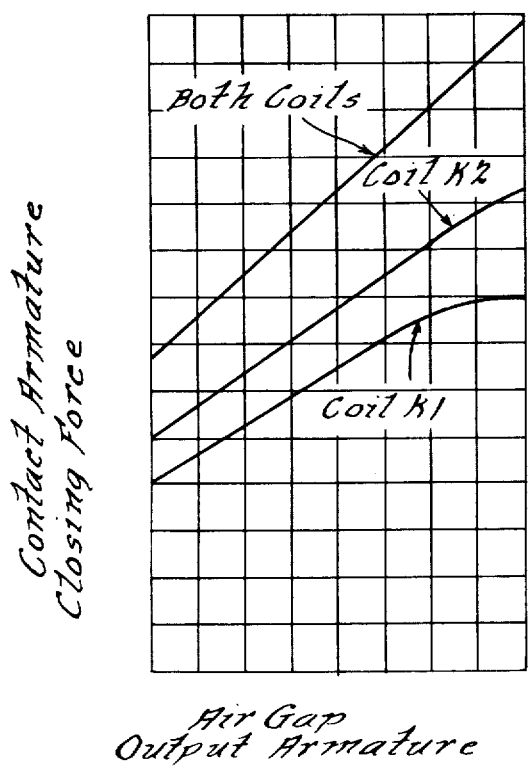
FIG. 13 is a representative graph showing output armature air gap as a function of contact armature closing force.
Figure 14:
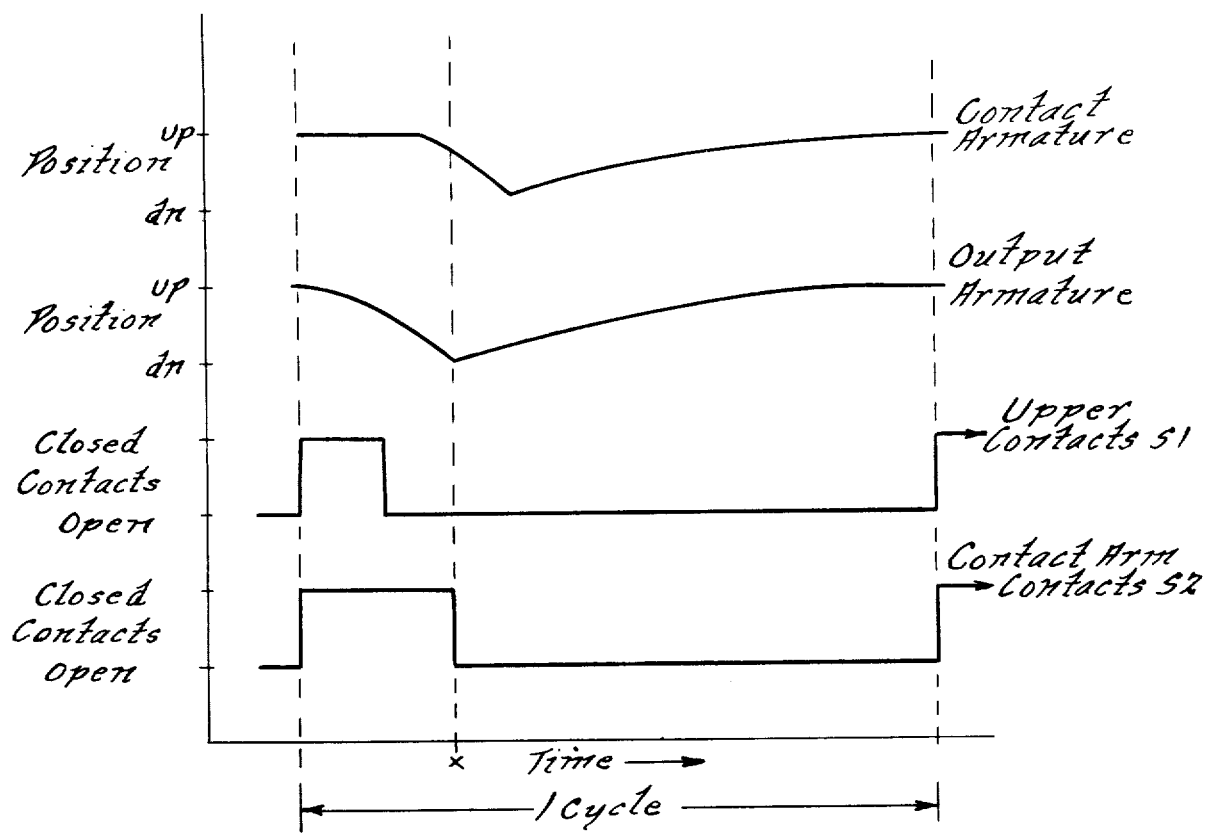
FIG. 14 is a representative theoretical diagram illustrating the condition and position of the various parts of the assembly during one cycle of operation.
Figure 15:
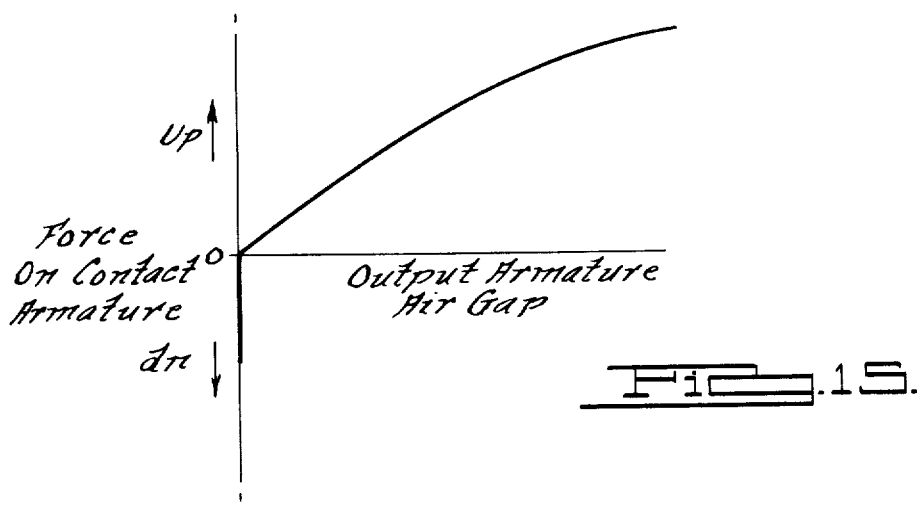
FIG. 15 is a representative graph showing the direction and magnitude of the force on the contact armature as a function of output armature air gap.

The specific mode of operation and timing of the invention may be best understood with reference to FIGS. 12-15. FIG. 14 theoretically illustrates the position and condition of the respective parts of the apparatus for a single cycle of operation, the abscissa of the diagram representing time. For purposes of explanation, it is assumed that a cycle starts when the apparatus in the position illustrated in FIG. 5, namely all of the contacts are closed and the contact and output armatures are in their uppermost positions. At that point, if power is being supplied to the apparatus, contacts 434 and 472 will cause coil K1 to be energized and contacts 432 and 476 will cause coil K2 to be energized. The resulting magnetic field will cause the output armature to move downwardly to cock power spring 306. The contact armature will remain in its upper position for the reasons discussed previously in connection with the first embodiment. As the output armature approaches contact with the upper surface of core 328 the flux necessary to continue movement is reduced because of the smaller air gap and power consumption can be reduced by having contacts 474 and 482 open to deenergize coil K1. The output armature continues its downward movement, however, under the influence of flux generated by coil K2 and as it approaches engagement with the core the magnetic force maintaining the contact armature in its upper position is reduced to a point less than the preload on compression spring 446, whereupon the contact armature starts moving downwardly. The output armature thereafter engages the core (point x on the abscissa of FIG. 14). Meanwhile, as can be seen in FIGS. 13 and 15, as the output armature air gap approaches zero there is first a decrease and then a reversal in the forces on the contact armature as a result of the magnetic flux of coil K2, thus accelerating the downward movement of the contact armature. After a small amount of downward movement of the contact armature contacts 432 and 476 are opened, thereby deenergizing coil K2 (point x on the abscissa of FIG. 14). Because of the relatively slow decay of the flux field and the influence of spring 446 and momentum, the contact armature may continue its downward movement until insulating washer 436 thereon engages the upper surface of the output armature. As soon as both coils are deenergized the output armature starts moving upwardly under the influence of power spring 306 until it completes the cycle by reaching its uppermost position illustrated in FIG. 5. During the course of its upward movement it engages the insulated surface of the contact armature and thereafter also raises it to its uppermost position. The apparatus thereafter recycles in the same manner.

Cushioning layer 412 (which can be omitted if desired) significantly attenuates the operating noise of the motor. Interestingly, it has been discovered that when there is a 30 mil gap between the output armature and the core, the force on the output armature is reduced approximately 30%, whereas when a 30 mil thickness rubber/iron layer is disposed in this gap, the force loss is only approximately 10%.

FIG. 15 illustrates what has been observed as the force on the contact armature as a function of output armature air gap (i.e., the air gap between the output armature and core at the axis of the contact armature. It shows the force decrease and reversal phenomenon which has been noted, and which is so important to the operation of the motor as a demand device. This curve is applicable to the motor of all embodiments of the present invention. In those embodiments in which cushioning layer 412 is used, the air gap does not go all the way to zero so there may be no force reversal as such; however, the force decreases to the point where the light spring forces on the contact armature are fully adequate to start its downward movement.

FIG. 12 illustrates the theoretical force exerted on the output armature by the flux of coils K1 and K2 as a function of the output armature air gap. The light curves indicate the characteristics of the individual coils and the combined coils, and the heavy curve illustrates what is believed to be a representation of the actual curve of the present apparatus as one coil is deenergized. For purposes of explanation, it will be assumed that the desired output force is that indicated at y on the absicca of the curve. Theoretically, it would appear that the actual curve of the present apparatus would follow the curve for both coils from the top thereof all the way to point b at which time deenergization of coil K1 would cause the curve to jump horizontally to the left to point c, whereupon the curve would continue downwardly along the curve for K2 alone. It has been discovered in actual practice, however, that because of the back EMF generated by the coils upon deenergization it is possible to open contacts at point a on the curve, and that when this is done the curve generally follows the heavy line version illustrated. Use of the back EMF permits earlier contact opening time and thus a further reduction in power consumption. Obviously, the individual coil sizes may be chosen to give the desired output curve, and can even be the same if desired.

The exact point that contacts 432 and 467 open (with respect to the position of the contact armature) is determined by the setting of adjusting screws 458, which operate to tilt the entire contact assembly 310 upwardly or downwardly within elastomeric grommet 488. The exact point that contacts 474 and 482 open (with respect to the position of output armature assembly 308) may be adjusted by thereafter adjusting screw 456 through the aligned access opening in beam 480.

The vacuum pump operates as a demand pump in exactly the same manner as does the pump in FIGS. 1-4. Downward movement of the output armature cocks the power spring and moves the piston on its intake stroke, and upward movement caused by the power spring upon deenergization of both coils results in returning the output armature to its original position while causing the piston to move on its pumping or exhaust stroke.

The third embodiment of the invention, illustrated in FIGS. 16-20, is a demand pump for creating a positive pressure (as distinguished from the vacuum pumps of the first two embodiments), and is believed to be ideally suited for use as a fuel pump for an automotive vehicle engine. The pump comprises a motor 302 (substantially identical to that of FIG. 5, and secured in place with fasteners 501), a pump assembly 500, a power spring 502 for actuating the pump, and an output armature assembly 504 interconnecting the motor and ump assembly for the purpose of cocking power spring 502. The circuit means comprises a contact beam assembly 506, a contact armature assembly 312 (identical to that of the embodiment of FIG. 5), and a power supply which is also identical to that of the embodiment of FIG. 5 and shown in phantom at 314. The pump is disposed within a housing 508 formed of aluminum or other non-ferrous material. Housing 508 is essentially configured as an open top box, the inclined open end of which is enclosed by a cover 510 by means of suitable threaded fasteners 509 passing through peripheral mounting flanges 512 and 514 on housing 508 and cover 510, respectively. A sealing gasket 516 is disposed therebetween. A vent 517 may be provided if desired. Because many of the parts of the present embodiment are substantially identical to those of the preceding embodiment, description will not be repeated and identical reference numerals are used to indicate previously described parts.

The primary difference between this third embodiment and the preceding embodiments is that pump assembly 500 is designed to create a positive pressure, whereas the pump assembly of the previous embodiments is designed for use as a vacuum pump. Pump assembly 500 comprises a fitting 518 (preferably formed of a non-ferrous metal) defining an inlet passageway 520 and an outlet passageway 522, to which suitable hoses or the like may be connected in the usual manner. Inlet passageway 520 communicates with an elastormeric inlet valve 524 held against an integrally formed valve seat on fitting 518 by a compression spring 526 acting at its opposite end against a retainer 528 affixed to fitting 518 and having flow openings 529 therethrough. Outlet passageway 522 is controlled by an elastomeric outlet valve 530 biased by means of a compression spring 534 into a normally closed position against an apertured seat 532 mounted on fitting 518. Both valve chambers are fluted, as at 535, to provide a flow path when the valve is open. Cover 510 is provided with a segmented annular flange 536 having a plurality of spaced inwardly directed integral lugs 538 defining annular slots 540. Fitting 518 is provided with a plurality of outwardly projecting spaced lugs 542 engageable within slots 540. Assembly is effected by placing fitting 518 in place with lugs 542 disposed circumferentially between lugs 538, and thereafter rotating the fitting to move lugs 542 into locking engagement in slots 540, much in the same manner as a typical bayonet connection.

Pump assembly 500 is of the bellows type, comprising a brass bellows 544 soldered at one end to a flange 546 on a piston 548 and soldered at the other end to a retainer 550 the upper end surface of which is in fluid communication with inlet valve 524 and outlet valve 530. Piston 548 is interconnected to output armature assembly 504 by means of a connecting rod 552 soldered to the bottom of piston 548 and loosely passing through a center opening in a stabilizing guide washer 556 affixed to flange 546 on piston 548. Each of the aforesaid soldered connectors provides a leak-tight seal, and retainer 550 is sealed with respect to cover 510 and fitting 518 by means of an annular elastomeric seal 554. Piston 548 is sized to minimize the clearance or reexpansion volume of the pumping chamber within the bellows.

Output armature assembly 504 is substantially identical to that of the preceding embodiment, except for the manner in which the working end of lever 398 is connected to the pump. In this embodiment, lever 398 is provided with an opening 557 in which is disposed a metal socket element 558 crimped around a ball 560 having an aperture therein in which is disposed a soldered extension 561 on connectiong rod 552. A low friction bearing member 562, formed of Teflon or the like, is disposed between ball 560 and the bottom of socket element 558. The outside of socket element 558 has an annular spring retaining flange 564 surrounding opening 556 and is held in position on lever 398 by the engagement of power spring 502 on flange 564. The lower end of power spring 502 may be maintained in position by means of an integral boss 566 formed in the bottom wall of housing 508.

Operation of motor 302 is identical to that described in connection with the preceding embodiment. The downward movement of the output armature causes piston 548 to move from the position illustrated in FIG. 16 (top or end of its pumping stroke) downwardly on its intake stroke, during which inlet fluid is drawn in through passageway 520 across inlet valve 524 at the same time power spring 502 is cocked. Upon deenergization of motor 302, power spring 502 forces piston 548 upwardly on its exhaust or pumping stroke whereupon fluid in the pumping chamber is forced outwardly across outlet valve 530 and through outlet passageway 522. The pump will continue to cycle so long as output pressure is less than the maximum pressure obtainable by power spring 502 as cocked by the output armature.

Contact beam assembly 506 is substantially identical to that of the preceding embodiment, the only significant change being that lever 454 has been shortened to make room for the pump assembly, adjustment of the lower pair of contacts being accomplished by using a pair of adjusting screws 568 passing through lever 454 and threadably engaging suitable openings in bosses 570 formed integrally in the side walls of housing 508. Springs 572 are disposed between bosses 570 and lever 454 for the same purpose as in the previous embodiment. In addition, the electrical connections to contact beam assembly 506 are by means of internally disposed spaced terminals 574 and 576, rather than via an external plug arrangement, and the beam assembly is supported on a suitable bracket 578 affixed to the wall of housing 508 rather than being located in an elastomeric grommet. The assembly, however, functions in exactly the same manner as that of the previous embodiment.

Power supply 314 is disposed within an enclosure defined by the upper surface of cover 510 and an L-shaped lid 580 retained by means of a pair of conventional threaded fasteners 582.

The pump of the present invention is ideally suited for use as a fuel pump in an automotive vehicle because it operates as a demand-type device, i.e., pumping occurs only when pressure drops below that achievable with a power spring used as cocked by the motor, on a fully automatic basis. Many conventional fuel pumps have such excess capacity at low engine loads (in order to have adequate capacity at high speeds) that it is necessary to place them in the fuel tank to facilitate the dumping of excess fuel at low speeds. The present pump can be designed so that there is no excess fuel at any speed, and therefore it does not need to be placed in the fuel tank, although it can be if desired.

The fourth embodiment of the invention, illustrated in FIGS. 21 through 24, is also a demand pump ideally suited for use as a fuel pump for an automotive vehicle engine. The fuel pump of this embodiment differs from the preceding embodiment in that it is provided with means whereby pump output is modulated in response to vehicle engine load, as determined by engine intake manifold vacuum. Because most of the parts of the present embodiment are substantially identical to those of the preceding embodiment, the description will not be repeated, and identical reference numerals are used to indicate the previously described parts.

The primary difference between this embodiment and the previous one is the additional structure best illustrated in FIG. 21, comprising generally a fluid motor 600 actuatable in respose to engine manifold vacuum communicated thereto via a nipple 610 to cause tensioning of an extension control spring 612 operable upon output arature assembly 504. Fluid motor 600 comprises two shell portions 614 and 616 affixed together using the same type "bayonet" connection used to mount fitting 518 to cover 510 in the preceding embodiment. Shell portions 614 and 616 may be formed of aluminum or other non-ferrous material, and are affixed to the fuel pump housing by means of a threaded boss 621 on shell portion 614 threadably disposed within an appropriate threaded opening in the lower wall of housing 508. The peripheral edge of a rolling lobe diaphragm 618 is sealingly clamped between shell portions 614 and 616, and the center portion of diaphragm 618 is sealingly clamped between cup-shaped elements 620 and 622, which are in turn held together by means of a fitting 624. Element 620 has a downwardly depending rim 626 engageable with a surface 628 in the vacuum chamber 630 defined between the diaphragm and shell portion 616 in order to limit the downward movement of the diaphragm. Upward movement is limited by engagement of the top rim of element 622 with the corresponding surface of shell portion 614. A biasing spring 632 acts between shell portion 616 and element 620 to bias the diaphragm and associated assembly upwardly. Rotatably supported by fitting 624, by means of a pair of snap rings 634 and 636, is an adjusting shaft 638 having at the lower end a hex socket 640 and at the opposite end a threaded protion 642 on which is threadably mounted an adjusting nut 644 having the lower end of control spring 612 threadably engaged about the outer surface thereof. Sealing around shaft 638 is provided by means of an O-ring 645. The upper end of control spring 612 is threadably mounted upon a suitable mounting element 646 secured to the bottom of socket element 558 by means of a conventional fastener 648. As can be visualized, the pretension of control spring 612 may be easily varied by inserting a hex tool through nipple 610 into engagement with socket 640, whereupon rotation of adjusting shaft 642 will cause adjusting nut 644 to move upwardly or downwardly (depending upon the direction of rotation) to vary the pretension of the spring.

As in the previous embodiment, actuation of motor 302 causes a cocking of power spring 502 and, upon deactuation of the motor, power spring 502 causes the pump to move through its pumping stroke. Control spring 612 is an extension spring so that any force that it exerts on the output armature is in the opposite direction to and must be subtracted from the pumping force exerted by power spring 502. This arrangement is used to modulate the output of the pump generally in accordance with the graph of FIG. 24.

The graph of FIG. 24 illustrates representatively the relationship between fuel pump output and intake manifold vacuum in a system controlled by the present invention. Generally speaking, the portion of the curve between a and b is the system condition during which the engine is at full throttle and the pump is delivering maximum output pressure, the latter being determined by power spring 502 and motor 302 in the manner described previously. The portion of the curve between b and c represents the road load condition of the system during which pump output pressure is modulated by the apparatus of the present invention. Specifically, the output pressure for a given manifold vacuum is determined by the position of diaphragm 618 within fluid motor 600, point b on the curve occuring when the apparatus is in the position shown in FIG. 21, and point c on the curve occuring when element 620 is in its lowermost position with rim 626 in engagement with surface 628. The position of point b in the left-to-right direction is established by the preload on control spring 632. The portion of the curve between c and d represents the idle condition of the system in which pump output is at a minimum output pressure. This occurs, as noted, when the diaphragm in fluid motor 600 is in its lowermost (or maximum vacuum) position. One of the very significant advantages of modulating fuel output in response to engine load is that the use of lower fuel pressures under lower fuel demand conditions results in lower float bowl fuel level in carbureted engines. This in turn reduces fuel consumption.

The fifth embodiment of the invention, illustrated in FIGS. 25 through 28, is also a demand pump ideally suited for use as a fuel pump for an automotive vehicle engine. The fuel pump of this embodiment differs from the preceding embodiment in that, in addition to the provision of means whereby pump output is modulated in response to vehicle engine load, there is also means for modulating pump output in response to engine speed, as determined by the pressure differential across the engine coolant pump. Because most of the parts of the present embodiment are substantially identical to those of the preceding two embodiments, the description will not be repeated, and identical reference numerals are used to indicate the previously described parts.

The primary difference between this embodiment and the previous one is the additional structure best illustrated in FIG. 25, comprising generally a fluid motor 700 actuatable in response to coolant pump output pressure differential communicated thereto via nipples 710 and 737 to thereby increase the compression of a compression control spring 712 operable upon output armature assembly 504. Fluid motor 700 comprises an end piece 714, a body 715 crimped thereto and a closure 716 having nipple 710 affixed thereto. Body 715 and closure 716 are affixed together using the same type "bayonet" connection used to mount fitting 518 to cover 510 in the third embodiment. The fluid motor may be formed of aluminum or other non-ferrous material, and is affixed to the fuel pump housing by means of a threaded boss 721 on end piece 714 threadably disposed within an appropriate threaded opening in the lower side wall of housing 508. The peripheral edge of a diaphragm 718 is sealingly clamped between body 715 and closure 716, and the center portion of diaphragm 718 is sealingly clamped between cup-shaped elements 720 and 722, which are in turn held together by means of a fitting 724. Element 720 has a rim 726 engageable with a partition 728 in body 715 in order to limit the leftward movement of the diaphragm (as shown). Movement in the opposite direction is limited by engagement of the rim of element 722 with the corresponding surface on closure 716. Fitting 724 slidingly extends through partition 728 and has a piston 730 affixed at its other end, the latter being retained in place by a snap ring 732. A sliding seal 734 is provided between fitting 724 and partition 728, thus defining a sealed chamber 736 between the diaphragm and the partition. Fluid communication with chamber 736 is achieved via nipple 737 in body 715. The opposite side of the diaphragm defines a chamber 738 with respect to closure 716.

End piece 714 has a central bore therethrough in which is slidably disposed an actuator 740 having an elarged head 742 in coaxial facing relationship with piston 730. Control spring 712 is disposed between actuator 740 and piston 730 so that movement of the diaphragm to the left (as shown) increases the compression of central spring 712 and hence the leftward bias on actuator 740, the outer end of which engages an arm 744 rigidly connected to output armature 504 which is in turn pivotally supported on shaft 400. As can be visualized, the greater the clockwise bias on arm 744, the greater the bias on the output armature in a pumping direction, and vice versa.

To compensate for the nonlinearity of coolant pump output as a function of engine speed, a tapered compression compensating spring 745 is provided between piston 730 and end piece 714.

The overall system of this embodiment is best illustrated in FIG. 28. The fuel pump is connected to the fuel tank and carburetor (or injectors) in the manner illustrated and fluid motor 600 is connected to the engine intake manifold in the usual manner. If desired, a conventional accumulator 743 may be interposed in the fuel line between the fuel pump and carburetor (or injectors) in order to level output pressure. A conventional centrifugal coolant pump is shown at 746, having an impeller 748 driven by the engine via a fan belt 747 and pulley 749, an output chamber 750 and an inlet chamber 752. Output chamber 750 is connected via a suitable hose (not shown) to nipple 710 to place chamber 738 in communication with coolant pump output pressure, and inlet chamber 752 is connected via a suitable hose (not shown) to nipple 737 to place chamber 736 in communication with coolant pump return pressure. Diaphragm 718 thus operates in response to the pressure diffrnetial created by the coolant pump, and this differential is a function of engine speed. It is a more accurate indicator of speed than absolute output pressure because it compensates for static pressure.

Because the output pressure of a centrifugal pump is a high order function of its speed, compensation spring 745 is chosen to privide compensation so that the net biasing force on actuator 740 is approximately linearly proportional to rotor (and hence engine) speed. The fuel pump of this embodiment therefore modulates fuel pressure in accordance with engine speed so that at higher speeds there is increased fuel pressure, and generally more control over fuel delivery.

The sixth embodiment of the invention, illustrated in FIG. 29, is fully applicable to the third, fourth and fifth embodiments disclosed in FIGS. 16-28. The only difference between the sixth embodiment and the aforesaid previous ones is that the bellows-type fuel pump is replaced with a diaphragm pump, indicated generally at 800 in FIG. 29. Because most of the parts of the present embodiment are substantially the same as those of the preceding three embodiments, the description will not be repeated, and identical reference numbers are used to indicate the previously described parts.

The pump of this embodiment comprises a diaphragm 810 having its outer periphery sealingly clamped between fitting 518 and housing 510 and being sealingly connected at its center in the usual manner to a connecting rod 812, which in turn is connected (not shown) to the output armature assembly in the same manner as in the aforesaid previous embodiments. Inlet passage 520 is controlled by an inlet ball valve 814 which is biased into normally closed sealing engagement with fitting 518 by a compression spring 816 supported by an open-center two-piece retainer affixed to the fitting. Outlet flow is controlled by outlet ball valve 820 biased into sealing engagement with a valve seat 824 by means of a compression spring 822. A pumping chamber is thus defined between the diaphragm and the two valves. If desired, valves of the type shown in FIG. 16 may alternatively be used, and vice versa. The fuel pump of this embodiment functions in all ways the same as those of the embodiments of FIGS. 16-28.

While the motor has been disclosed for use in conjunction with vacuum and fuel pumps, it may find other varied applications both with and without the pumps of the present invention.

Thus, there is disclosed in the above description and in the drawings an improved electric pump which fully and effectively accomplishes the objectives thereof. However, it will be apparent that variations and modifications of the disclosed embodiments may be made without departiong from the principles of the invention or the scope of the appended claims.

I claim:
1. A motor comprising:
an inner pole member having a longitudinal bore extending therethrough;
a coil surrounding said inner pole member;
an outer pole member having one end connected to one end of said inner pole member and an opposite end disposed in spaced relationship to the opposite end of said inner pole member, thereby defining a gap therebetween;
contact armature means movably disposed within said bore and having a contact thereon;
contact means engageable by said contact when said contact armature moves in one direction;
output armature means mounted for movement between a first position immediately proximate to said gap and a second position spaced therefrom;
biasing means urging said output armature toward said second position and said contact toward said contact means; and
circuit means interconnecting said coil, said contact and said contact means such that said coil is energized when said contact means and said contact are engaged, said coil being operable to induce a magnetic field to cause said output armature to move to said first position and to cause said contact thereafter to move out of engagement with said contact means to deenergize said coil.

2. A motor as set forth in claim 1, wherein said contact armature means comprises an elongated contact armature and an extension member coaxially secured to one end thereof.

3. A motor as set forth in claim 2, werein said contact is disposed at the opposite end of said contact armature.

4. A motor as set forth in claim 3, wherein said contact armature is formed of a magnetic material and said extension member is formed of a non-magnetic material.

5. A motor as set forth in claim 1, further comprising an outwardly projecting support arm affixed to one of said pole members, said output armature means being pivotably mounted on said support arm.

6. A motor as set forth in claim 5, wherein said contact means comprises a spring finger having one end secured to said support arm and a contact secured to another end thereof, said spring finger contact being engageable with said contact armature contact when said contact armature is moved in said one direction.

7. A motor as set forth in claim 1, wherein said output armature has an opening provided therethrough, said contact armature extending through said openining.

8. A motor as set forth in claim 7, further including a collar member on said contact armature engageable with said output armature so as to cause said contact on said contact armature to move toward said contact means when said output armature moves toward said second position.

9. A motor as claimed in claim 8, wherein said contact is adjacent said collar member.

10. A motor as set forth in claim 1, wherein, a layer of insulating antifriction material is disposed between said contact armature and said bore.

11. A motor as set forth in claim 1, wherein said contact armature has an insulating antifriction coating on the outer surface thereof.

12. A motor as set forth in claim 11, wherein said coating is a tetrafluoroethylene fluorocarbon polymer.

13. A motor as set forth in claim 11, wherein said circuit means further includes transistor means, said transistor means being operable to energize said coil in response to engagement of said contact armature contact and said contact means.

14. Apparatus comprising:
pole means providing a generally closed flux path, said pole means being formed of ferrous magnetic material having low residual magnetism;
means defining a longitudinal bore through said pole means;
a coil surrounding a portion of said pole means;
means defining a gap in said pole means in the flux path thereof;
armature means movably disposed within said bore;
control means mounted for movement between a first position immediately proximate to said gap and a second position spaced therefrom, said control means comprising ferrous magnetic material having low residual magnetism; and
circuit means for energizing said coil, said armature means being biased out of said bore when said coil is energized and said control means is in said second position and into said bore when said coil is energized and said control means is in said first position.

15. The apparatus as claimed in claim 14, wherein said circuit means energizes said coil with the same polarity for all positions of said control means.

16. The apparatus as claimed in claim 14, wherein said control means is disposed in close proximity to said armature means when disposed in said first position.

17. The apparatus as claimed in claim 16, wherein said control means surrounds said armature means in spaced close proximity thereto.

18. The apparatus as claimed in claim 14, wherein a portion of the length of said armature means is formed of ferrous magnetic material having a low residual magnetism.

19. The apparatus as claimed in claim 18, wherein said portion of said armature means is of a length less than or equal to the length of said bore.

20. The apparatus as claimed in claim 19, wherein said length is approximately the same as that of said coil.

21. The apparatus as claimed in claim 14, further comprising low friction bearing means disposed in said bore for slidably supporting said armature means.

22. The apparatus as claimed in claim 21, wherein said armature means is maintained in spaced relationship to the walls of said bore.

23. The apparatus as claimed in claim 14, wherein energization of said coil causes said control means to move to said first position thereof.

24. The apparatus as claimed in claim 14, further comprising an output armature movable in response to energization of said coil, said control means forming a part of said output armature.

25. The apparatus as claimed in claim 14, further comprising contact means carried by said armature means, said contact means cooperating with said circuit means to cause energization of said coil in response to the position of said armature means.

26. The apparatus as claimed in claim 25, wherein said contact means causes energization of said coil when said armature means moves out of said bore.

27. The apparatus as claimed in claim 26, wherein energization of said coil causes said control means to move to said first position thereof, whereby said apparatus cycles automatically.

28. The apparatus as claimed in claim 27, further comprising work output means affixed to and movable with said control means.

29. The apparatus as claimed in claim 14, further comprising a cushioning layer on said control means disposed between said control means and said gap, said layer comprising an elastomeric composition mixed with a ferrous magnetic material.

30. The apparatus as claimed in claim 29, wherein said composition comprises approximately equal proportions of rubber and finely divided iron.

31. The apparatus as claimed in claim 14, wherein said gap is located closely adjacent said bore.

32. The apparatus as claimed in claim 14, wherein said pole means is generally U-shaped in configuration having two legs and a bight portion, with said bore extending longitudinally through one of said legs.

33. The apparatus as claimed in claim 32, wherein said coil surrounds said one leg of said pole means.

34. The apparatus as claimed in claim 14, wherein two separate coils surround said portion of said pole member.

35. The apparatus as claimed in claim 34, wherein said coils are wound simultaneously to provide a fully intermeshed dual coil arrangement.

36. The apparatus as claimed in claim 14, wherein said control means is magnetically isolated from said pole means when in said second position.

37. The apparatus as claimed in claim 36, wherein said pole means is disposed within a non-ferrous housing and said control means is movably supported by said housing.

38. The apparatus as claimed in claim 37, further comprising work output means affixed to and movable with said control means.

39. Apparatus comprising:
pole means providing a generally closed flux path, said pole means being formed of ferrous magnetic material having low residual magnetism;
means defining a longitudinal bore through said pole means;

a coil surrounding a portion of said pole means;

means defining a gap in said pole means in the flux path thereof;

low friction bearing means disposed within said bore;

armature means slidably disposed within said bearing means in said bore;

output means mounted for movement between a first position immediately proximate to said gap and a second position spaced therefrom, said output armature means comprising ferrous magnetic material having low residual magnetism; and circuit means responsive to the position of said contact armature means for energizing said coil, said contact armature means being biased out of said bore when said coil is energized and said output armature means is in said second position, energization of said coil causing said output armature means to move from said second position.

40. The apparatus of claim 39, wherein said bearing means is formed of Teflon.

41. Apparatus comprising:

pole means providing a generally closed flux path, said pole means being formed of ferrous magnetic material having low residual magnetism;

means defining a longitudinal bore through said pole means;

a pair of coils surrounding a portion of said pole member;

means defining a gap in said pole means in the flux path thereof;

armature means movably disposed within said bore;

output means mounted for movement between a first position immediately proximate to said gap and a second position spaced therefrom;

circuit means for energizing said coil to move said output means from said second position to said first position, said circuit means including a first pair of contacts for controlling one of said coils and a second pair of contacts for controlling the other of said coils, and means for closing both of said pairs of contacts when said output means is in said second position to cause the latter to move toward said first position, and for opening one of said pairs of contacts before said output means reaches said first position to thereby reduce the power consumption of said apparatus.

* * * * *